(12) United States Patent
Bauer

(10) Patent No.: US 11,280,317 B2
(45) Date of Patent: Mar. 22, 2022

(54) AIRBORNE SYSTEM AND AIRBORNE POWER GENERATION SYSTEM AND METHOD

(71) Applicant: kiteKRAFT UG (haftungsbeschränkt), Munich (DE)

(72) Inventor: Florian Bauer, Munich (DE)

(73) Assignee: KITEKRAFT UG (HAFTUNGSBESCHRANKT), Munich (DE)

( * ) Notice: Subject to any disclaimer, the term of this patent is extended or adjusted under 35 U.S.C. 154(b) by 193 days.

(21) Appl. No.: 16/648,143

(22) PCT Filed: Sep. 14, 2018

(86) PCT No.: PCT/EP2018/074927
§ 371 (c)(1),
(2) Date: Mar. 17, 2020

(87) PCT Pub. No.: WO2019/057634
PCT Pub. Date: Mar. 28, 2019

(65) Prior Publication Data
US 2020/0256313 A1 Aug. 13, 2020

(30) Foreign Application Priority Data
Sep. 21, 2017 (EP) .................................... 17192432

(51) Int. Cl.
*F03D 9/32* (2016.01)
*B64C 31/06* (2020.01)
*F03D 5/00* (2006.01)
(52) U.S. Cl.
CPC ............... *F03D 9/32* (2016.05); *B64C 31/06* (2013.01); *F03D 5/00* (2013.01); *F05B 2240/921* (2013.01)

(58) Field of Classification Search
CPC .............. F03D 5/00; F03D 9/32; B64C 31/06
See application file for complete search history.

(56) References Cited

U.S. PATENT DOCUMENTS 4,285,481 A * 8/1981 Biscomb ................. F03D 13/20
244/33
7,602,077 B2 * 10/2009 Ferguson ................ F03D 3/002
290/55
(Continued)

FOREIGN PATENT DOCUMENTS

| WO | 2010135604 | 11/2010 |
| WO | 2010135604 | 1/2011 |
| WO | 2017116643 | 7/2017 |

OTHER PUBLICATIONS

European Patent Application No. 17192432.7, Extended European Search Report, dated Apr. 5, 2018, 5 pages.
(Continued)

*Primary Examiner* — Michael H Wang
(74) *Attorney, Agent, or Firm* — Kilpatrick Townsend & Stockton LLP

(57) ABSTRACT

The present invention refers to an airborne system (100') and in particular to an airborne power generation system (100). The airborne power generation system (100) comprises an airborne unit (10) configured (i) as an aerial vehicle (10'), in particular as a kite or a multicopter, and (ii) to harvest and convert wind power into electrical power, a ground unit (50) configured to send and/or receive electrical power to and from the airborne unit (10), respectively, and a coupling and tether unit (30) for mechanically and electrically coupling the airborne unit (10) to the ground unit (50) and configured to transmit electrical power between the airborne unit (10) and the ground unit (50). The airborne unit (10) comprises a plurality of motor/generator units (12) each of which having a wind harvesting/propelling rotor (14) mechanically
(Continued)

coupled thereto and groups (16) of motor/generator units (12) and their assigned electrical transmission paths are electrically and/or galvanically uncoupled, insulated, isolated and/or separated with respect to each other at least in the airborne unit (10) and the coupling and tether unit (30).

17 Claims, 26 Drawing Sheets

(56) References Cited

U.S. PATENT DOCUMENTS

| | | | |
|---|---|---|---|
| 9,378,865 B2* | 6/2016 | Broughton, Jr | H01B 7/043 |
| 9,698,642 B1 | 7/2017 | Goessling et al. | |
| 9,963,228 B2* | 5/2018 | McCullough | B64C 1/32 |
| 2012/0070122 A1* | 3/2012 | Lind | H02G 11/00 |
| | | | 385/103 |
| 2015/0184638 A1* | 7/2015 | Vander Lind | B29C 48/151 |
| | | | 242/601 |
| 2015/0375852 A1 | 12/2015 | Hallamasek | |
| 2016/0056621 A1* | 2/2016 | Patten | H01B 9/006 |
| | | | 174/40 R |
| 2016/0102654 A1* | 4/2016 | GilroySmith | F03D 80/70 |
| | | | 244/1 TD |
| 2017/0190418 A1* | 7/2017 | Patten | H01B 7/0009 |
| 2017/0213617 A1* | 7/2017 | Patten | H01B 7/0045 |
| 2017/0237370 A1 | 8/2017 | Vander Lind et al. | |
| 2018/0094619 A1* | 4/2018 | Sellers | D07B 1/145 |
| 2018/0094993 A1* | 4/2018 | Homsy | G01L 3/08 |
| 2019/0100305 A1* | 4/2019 | Patten | B64C 39/022 |
| 2019/0100874 A1* | 4/2019 | Patten | F03D 5/00 |

OTHER PUBLICATIONS

International Patent Application No. PCT/EP2018/074927, International Search Report, dated Dec. 13, 2018, 3 pages.

* cited by examiner 100,100'

Fig. 10

Tab. 1: Parameters of the two tether designs in Fig. 8.

| Parameter | Value for $n_c = n_{c,opt} = 24$ | Value for $n_c = 16$ | relative Difference |
|---|---|---|---|
| rated power $P_r$ | 5 MW | 5 MW | ±0 % |
| rated transmission voltage $U_{te,r}$ | 8 kV | 8 kV | ±0 % |
| tether efficiency $\eta_{te,r}$ | 98 % | 98 % | ±0 % |
| tether mass $m_{te}$ | 1.503 kg | 1.399 kg | −6.9 % |
| tether diameter $d_{te}$ | 54.7 mm | 56.1 mm | +2.6 % |

Tab. 2: Fuse ratings (or over-current shut-off ratings.)

| Fuse | Opening Condition | Relative Timing between Fuses |
|---|---|---|
| F1# | $\|I_{F1}\| \geq I_{max}$ | $T_{F1} \geq T_{min}$ |
| F2# | $\|I_{F2}\| \geq I_{max}$ | $(T_{F2} \geq T_{min}) \wedge (T_{F2} \neq T_{F1})$ |
| F3# | $\|I_{F3}\| \geq I_{max}$ | $T_{F3} > \max\{T_{F1}, T_{F2}\}$ |
| F4# | $\|I_{F4}\| \geq I_{max}$ | $(T_{F4} > \max\{T_{F1}, T_{F2}\}) \wedge (T_{F4} \neq T_{F3})$ |
| F5# | $\|I_{F5}\| \geq I_{max}$ | $T_{F5} > \max\{T_{F3}, T_{F4}\}$ |
| F6# | $\|I_{F6}\| \geq I_{max}$ | $T_{F6} > \max\{T_{F3}, T_{F4}\}$ |

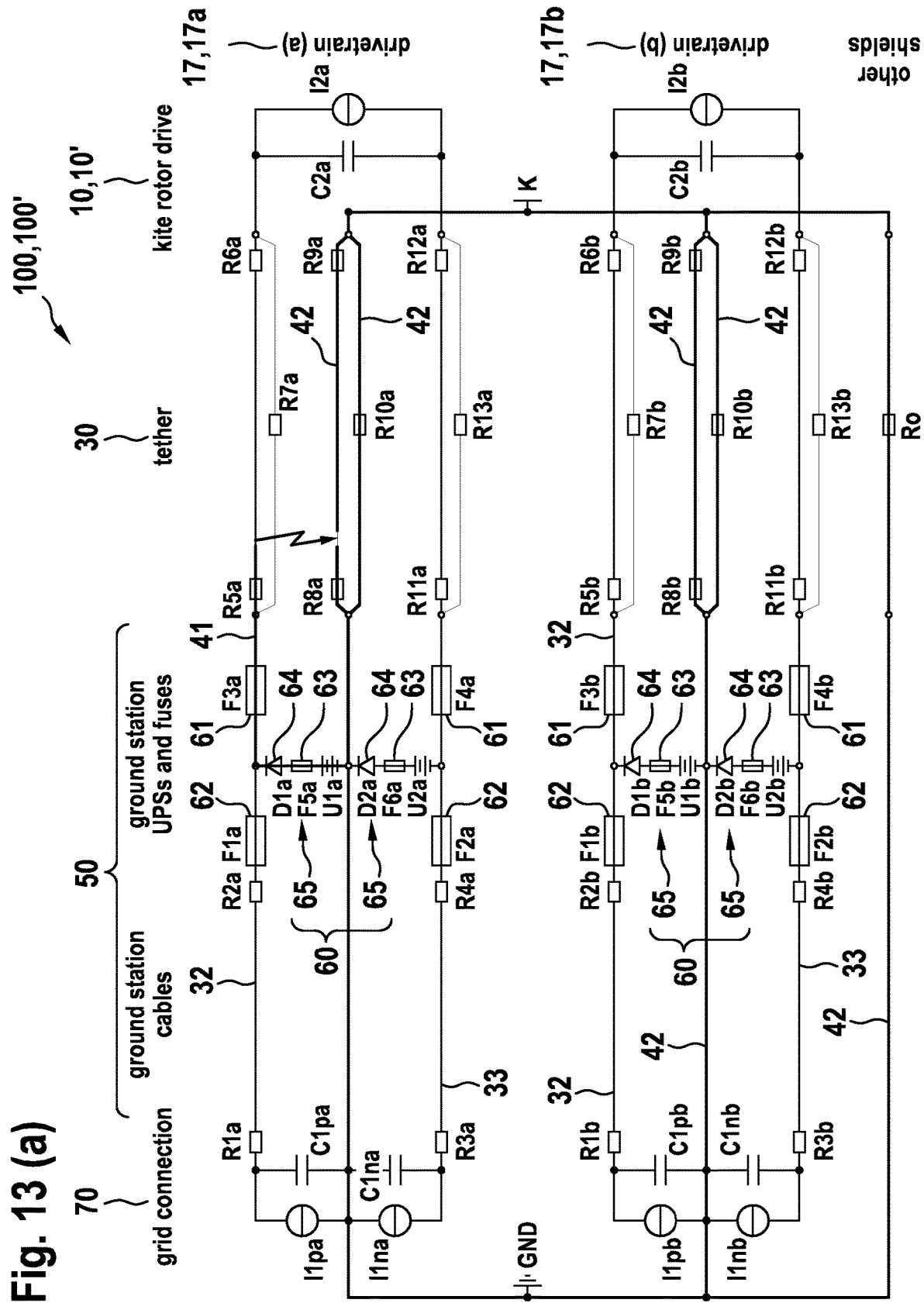

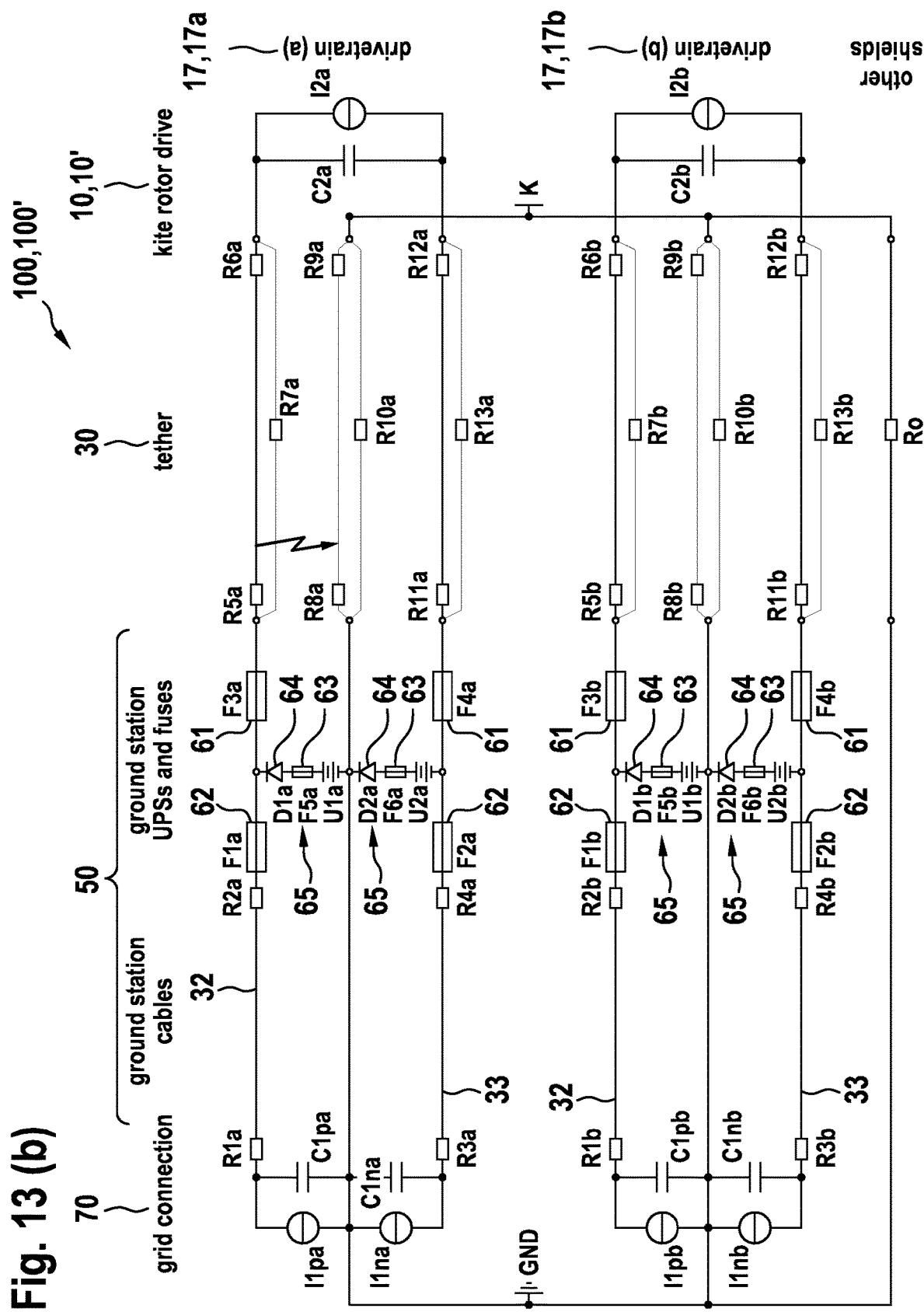

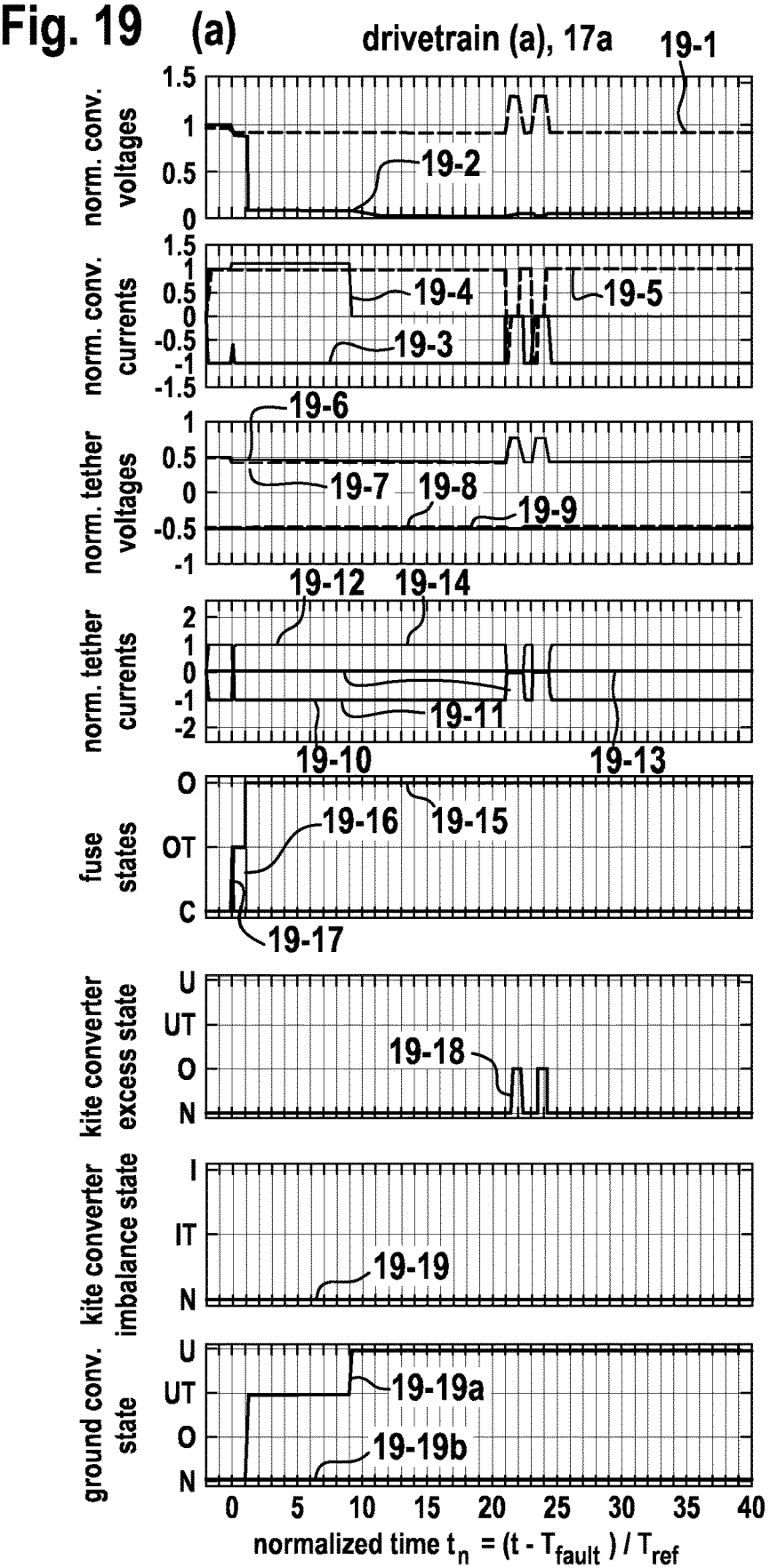

AIRBORNE SYSTEM AND AIRBORNE POWER GENERATION SYSTEM AND METHOD

The present invention refers to an airborne system, to an airborne power generation system, and method and in particular to an airborne wind power conversion system and method which are configured in order to harvest wind power and to convert the same into electrical power.

Harvesting and converting wind power into electrical power has become popular in recent years. Besides tower-based wind power conversion systems which are formed by a tower with a top equipped rotor-driven generator unit, airborne systems have been conceived, too. Such airborne systems differ from known tower-based wind power conversion systems in that the rotor-driven generator unit is carried by an aerial vehicle, i.e. on an airborne unit, which is flown through the air in order to interact with wind. The airborne unit is retained to a ground unit by a tether which carries the mechanical load and which is also capable of electrically coupling the aerial vehicle to the ground unit, in particular in order to transmit in a generator mode electrical power converted from wind power to the ground unit.

Difficulties have to be faced in connection with the reliability of the generator units which are also used in a motor mode for launching and landing the aerial vehicle before and after the process of harvesting and converting wind power. The same analogously applies to aerial vehicles of pure airborne systems having driving units which are electrically driven. More fault tolerant systems and operation modes are required.

It is an object underlying the present invention to provide an airborne system, an airborne power generation method, and a method of using an airborne system with an increased fault tolerance in particular in connection with the launching and landing of the underlying aerial vehicle in a motor mode and generator mode of airborne motor/generator units.

The object is achieved by an airborne system according to independent claim 1 and by an airborne power generation method according to independent claim 16, and by a method of using an airborne system according to independent claim 17. Preferred embodiments are defined in the respective dependent claims.

According to a first aspect of the present invention an airborne system is provided which comprises an airborne unit configured as an aerial vehicle, an electrical power source/sink unit configured to supply, receive and/or store electrical power, and a coupling unit for electrically coupling the electrical power source/sink unit to or within the airborne unit. According to the present invention the airborne unit comprises a plurality of motor/generator units each of which having at least one wind harvesting/propelling rotor mechanically coupled thereto. The coupling unit is configured in order to electrically couple the electrical power source/sink unit with motor/generator units in order to transmit electrical power between the electrical power source/sink unit and motor/generator units. Groups of motor/generator units and their assigned electrical transmission paths are electrically and/or galvanically uncoupled with respect to each other at least in the airborne unit and in the coupling unit.

It is therefore a key aspect of the present invention to realize an electrical and/or galvanic separation of the groups of motor/generator units and their assigned electrical transmission paths with respect to each other. This ensures an improvement of the safety issues.

In case that the airborne system is referred to a pure airborne entity, the driving system of the underlying vehicle has to be supplied with electrical power by internal means. It is therefore of particular advantage if according to a preferred embodiment of the airborne system the electrical power source/sink unit (i) is at least partly comprised by the airborne unit and/or (ii) comprises or is formed by one or a plurality of electrical power storage means and/or by one or a plurality of solar power conversion means.

In particular respective groups of motor/generator units, electrical power storage means and/or solar power conversion means, and their assigned electrical transmission paths are electrically and/or galvanically uncoupled with respect to each other at least in the airborne unit and in the coupling unit.

In the sense of the present invention, (i) the respective groups of motor/generator units and their assigned electrical transmission paths on the one hand and (ii) the respective groups of motor/generator units, electrical power storage means and/or solar power conversion means, and their assigned electrical transmission paths on the other hand are referred to as groups in general.

In any case the key aspect of the present invention, namely the electric and/or galvanic separation of the groups of motor/generator units and their assigned electrical transmission paths is of particular advantage in this regard, too.

Alternatively, the airborne system can be configured in order to have a coupling to the ground. Thus, the airborne system may be formed as an airborne power generation system.

According to this additional or alternative aspect of the present invention the airborne system as an airborne power generation system may comprise an airborne unit (i) formed as a kite, an electrically driven plane and/or an electrically driven multicopter, and (ii) configured to harvest and convert wind power into electrical power.

A ground unit may be provided which comprises or which is formed by at least a part of the electrical power source/sink unit and which is configured to send and/or receive electrical power to and from the airborne unit, respectively.

The coupling unit may comprise or may be formed as a coupling and tether unit for mechanically and electrically coupling the airborne unit to the ground unit and configured to transmit electrical power between the airborne unit and the ground unit.

According to this additional or alternative view of the present invention the airborne unit comprises a plurality of motor/generator units each of which having a wind harvesting/propelling rotor mechanically coupled thereto, wherein groups of the plural motor/generator units have assigned electrical transmission paths. The groups of motor/generator units and their assigned electrical transmission paths are electrically and/or galvanically uncoupled, insulated, isolated and/or separated with respect to each other at least in the airborne unit and in the coupling and tether unit, but preferably in the ground unit, too. By these measures and in particular by electrically and/or galvanically uncoupling groups of motor/generator units and their assigned electrical transmission paths reliability of the airborne power generation system is increased as certain faults in the generator mode as well as in the motor mode can be reduced in their extent or even prevented thereby ensuring the underlying airborne unit's capability for safely launching and landing.

The mechanical coupling between the rotors and the underlying motor/generator units may be realized in different ways. For instance, a given rotor may be coupled to a single assigned motor/generator unit alternatively to a plurality of motor/generator units. According to other embodiments of the present invention, a given motor/generator unit might mechanically be coupled to a single rotor or to a plurality of rotors, instead.

The electrical and/or galvanic uncoupling can be realized by various means.

According to a preferred embodiment of the present invention, this may be done by providing a drivetrain for each group and assigning the drivetrain to the respective group, in particular in a decided and/or distinct manner. Additionally, the drivetrains as such are electrically and/or galvanically uncoupled, insulated, isolated and/or separated with respect to each other at least in the airborne unit and in the coupling unit in particular in the coupling and tether unit.

A respective group may comprise one or a plurality of motor/generator units, in particular with an even number of motor/generator units.

Under such circumstances, it is of particular advantage if each group comprises the same number of motor/generator units. This offers the opportunity to consider symmetry aspects, in particular in case that an unlikely primary fault occurs and in which case a complete group of motor/generator units can be shut-off in order to maintain balance of the airborne unit and of its flight.

On the other hand, it is also possible and of particular advantage if a respective group comprises a single motor/generator unit, only. Under such circumstances, each motor/generator unit is electrically and/or galvanically uncoupled from any other motor/generator unit.

In order to realize the uncoupling, the airborne unit may comprise for each respective group an assigned power electric converter and/or an assigned set and preferably a pair of cables, in particular as a part of a respective assigned drivetrain. In particular the cables—which may also be referred to as lines—may at least be provided at the coupling unit side or at the coupling and tether unit side of the respective assigned power electric converter and/or may be connected or connectable to the coupling unit, to the coupling and tether unit and in particular to respective corresponding assigned sets or pairs of cables of the coupling unit and in particular of the coupling and tether unit, i.e. with a corresponding distinct assignment.

In the sense of the present invention, any cable may be referred to as general electrical transmission line or the like.

According to a further additional or alternative embodiment of the present invention and in order to further enhance the uncoupling capabilities, the coupling unit and in particular the coupling and tether unit may comprise for each respective group an assigned set and preferably a pair of cables connected or connectable within or to the airborne unit and/or connected or connectable to the electrical power source/sink unit and in particular to the ground unit, in particular as a part of a respective corresponding assigned drivetrain and/or to respective corresponding assigned sets or pairs of cables of the airborne unit, the electrical power source/sink unit and of the ground unit, respectively.

Under such circumstances, each member of the pair of cables may have assigned thereto one of a positive electrical polarity and a negative electrical polarity.

The polarity may also change over time, thus referring to an alternating or multiphase current concept. In the case of a plurality of more than two phases, instead of pairs of cables the concept n-tuples of cables may be used when the number of phases of the multiphase electrical current concept is above 2.

The coupling and tether unit may comprise a core having a circumferential surface.

Pairs or n-tuples of cables may be aligned at the circumferential surface such that each member of the pair or n-tuple of cables having assigned thereto a given polarity of a DC system or one of the set of phases of an AC system may be aligned (i) directly adjacent to a member of a pair of cables having—at least in an operation mode—the same assigned electrical polarity or phase as well as a (ii) directly adjacent to a member of a pair of cables having—at least in an operation mode—the opposite assigned electrical polarity or another or different phase, respectively.

For further supporting the uncoupling capabilities of the airborne power generation system according to the present invention, it is of particular advantage if the ground unit comprises for each respective group an assigned set and preferably a pair of cables connected or connectable to the coupling and tether unit, in particular as a part of a respective corresponding assigned drivetrain, at a coupling and tether unit side of the ground unit and/or to respective corresponding assigned sets or pairs of cables of the coupling and tether unit.

With these measures the uncoupling and/or isolation of the distinctly assigned drivetrains is established along the entire electrical transmission path from the airborne unit, via the tether and coupling unit, down to the ground unit, as well as in the opposite direction.

In order to further ensure the launching capabilities for the aerial vehicle without negatively influencing the invention's uncoupling capabilities, it is of particular advantage if the ground unit comprises for each respective group of motor/generator units, in particular as a part of a respective corresponding assigned drivetrain, an assigned uninterruptible power supply unit, in particular at the coupling unit side or at the coupling and tether unit side of the ground unit and/or configured for supplying power to the respective corresponding assigned set or pair of cables for controllably operating the respective motor/generator units in a motor or propeller mode of the system, and/or an assigned power electronic converter configured to receive electric power from a respective corresponding assigned set or pair of cables, to convert said received electric power and to feed said converted electric power into a power sink such as resistors, a power grid or into an energy storage means, in particular at a side which is located opposite to the coupling unit side or to the coupling and tether unit side of the ground unit.

A further requirement that may preferably be fulfilled is the operation stability of the aerial vehicle during its flight.

It is therefore of particular advantage if according to a further preferred embodiment of the present invention a respective group comprises motor/generator units which in their entirety symmetrically contribute to the mass and/or the angular momentum distribution with respect to the center of mass of the underlying airborne unit.

For safety reasons it is preferred to have means installed which enable a selective shut-off of selected motor/generator units or groups thereof.

Hence, the electrical power source/sink unit and in particular the ground unit may accordingly comprise for each respective group, in particular as a part of a respective corresponding assigned drivetrain, an over-current shut-off system and in particular a fuse system which is configured in order to connect a cable of the set of cables to a reference or ground potential of the electrical power source/sink unit, of the ground unit and/or of the airborne unit, in particular in case that a current conveyed by the respective cable exceeds a threshold value Imax.

Under such circumstances it is preferred that a respective fuse system comprises for each respective group, in particular as a part of a respective corresponding assigned drivetrain, in each cable of the respective assigned set of cables a fuse unit having a first fuse or fuse element electrically connected in series in each cable of the set of cables.

In addition, at least one of (i) a second fuse element electrically connected in series to the first fuse element and in the respective cable of the set of cables and (ii) a third fuse element in parallel to (a) a serial node which is located at a side of the electrical power source/sink unit or between the first and second fuse elements and (b) to said reference or ground potential of the electrical power source/sink unit, the ground unit and/or of the airborne unit may be provide.

If applicable, said third fuse element is in serial connection combined with a diode element, both in parallel connection to the serial node between the first and second fuse elements, in particular the diode element may be connected in reverse direction relative to the potential difference between the potential of the respective cable and the reference or ground potential under normal operation conditions.

An even higher degree of reliability may be achieved by accordingly adjusting the timing behavior of the involved fuse elements.

Therefore and according to another preferred embodiment of the present invention relative trigger or switching times $T_{F1}, \ldots, T_{F6}$ of first to third fuses F1 to F6 of the fuse units underlying the fuse systems for the cables of the pair of cables of a given drivetrain fulfill the following conditions (1) to (6):

for the second fuse $F1$ of the first cable: $T_{F1} \geq T_{min}$, (1)

for the second fuse $F2$ of the second cable:
$T_{F2} \geq T_{min}{}^{\wedge} T_{F2} \neq T_{F1}$, (2)

for the first fuse $F3$ of the first cable: $T_{F3} > \max\{T_{F1}, T_{F2}\}$, (3)

for the first fuse $F4$ of the second cable:
$T_{F4} > \max\{T_{F1}, T_{F2}\}{}^{\wedge} T_{F4} \neq T_{F3}$, (4)

for the third fuse $F5$ of the first cable:
$T_{F5} > \max\{T_{F3}, T_{F4}\}$, (5)

for the third fuse $F6$ of the second cable:
$T_{F6} > \max\{T_{F3}, T_{F4}\}$, and (6)

wherein $T_{min}$ denotes a minimum delay time which determined—in particular in advance and/or fixed—in order to ensure that a fuse opens only due to a short circuit current, in particular driven by a respective underlying by a supplying uninterruptible power supply unit.

In the sense of the present invention a trigger or switching time of a fuse element is representative for the time interval which is necessary for the fuse element to react by separating electric and/or galvanic connection.

In connection with an electronic fuse used as a fuse element—also referred to as an electronic switch—the trigger and/or switching time may be defined in connection with a maximum current Imax wherein the fuse element triggers the electric and/or galvanic separation after an actual current has exceeded the maximum current Imax for a time span which corresponds to the value of the trigger or switching time.

When a melting fuse is used as a fuse element, a trigger and/or switching time T may be defined in connection with a thermal threshold given by the absorbed power $I^2T$ within the melting fuse initiating the melting of and thereby the separation by the melting fuse.

According to a further aspect of the present invention an airborne power generation method is provided wherein an aerial vehicle as an airborne unit and having power conversion means for converting wind power to electrical power is launched, controllably flown into a wind power harvesting trajectory and then operated in order to harvest and to convert wind power into electrical power, electrical power is transmitted to or from the aerial vehicle via a coupling and tether unit, and groups of motor/generator units and their assigned electrical transmission paths are operated in an electrically and/or galvanically uncoupled manner with respect to each other at least in the airborne unit and in the coupling and tether unit and preferably also in a ground unit.

Preferably, the airborne power generation method uses an airborne power generation system according to the present invention in order to carry out wind power harvesting and conversion.

According to still a further aspect of the present invention a method of using an airborne system is presented, wherein an aerial vehicle as an airborne unit is launched and controllably flown by providing electrical power to a plurality of motor/generator units each of which having at least one propelling rotor mechanically coupled thereto for driving the same, said electrical power is transmitted within the aerial vehicle via a coupling unit, and groups of motor/generator units and their assigned electrical transmission paths are operated in an electrically and/or galvanically uncoupled manner with respect to each other at least in the airborne unit and in the coupling unit.

According to a preferred embodiment of the method of using an airborne system an airborne system according to the present invention is used.

These and further details, advantages and features of the present invention will be described based on embodiments of the invention and by taking reference to the accompanying figures.

FIGS. 1 to 3 schematically describe embodiments of the airborne power generation system according to the present invention based on different types of underlying airborne units in the form of aerial vehicles formed as kites.

FIG. 10 shows tables which describe certain operation parameters for embodiments of the airborne power generation system according to the present invention.

Figure 12:
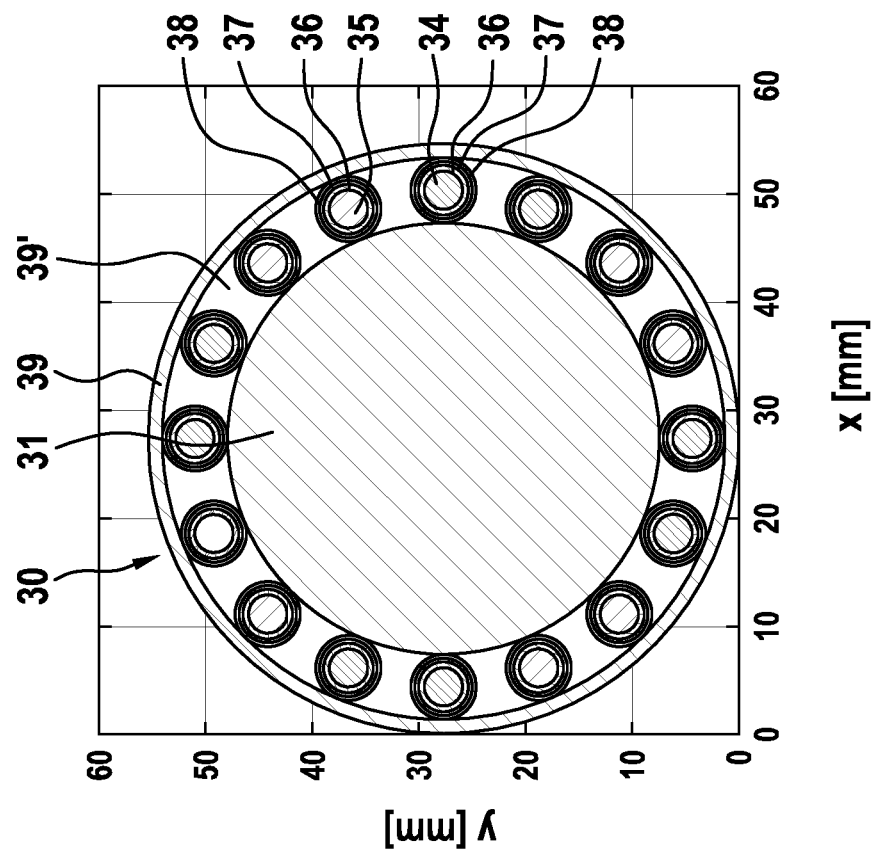

FIG. 12 gives a cross-sectional view representing a coupling and tether unit that may be involved in an embodiment of the airborne power generation system according to the present invention with a particular focus on the assignment of the polarity of potentials of directly adjacent cables.

FIGS. 13 to 19 elucidate by means of equivalent circuits and graphs showing states, currents and voltages different operation modes which are configured to handle certain operation faults.

In the following embodiments and the technical background of the present invention are presented in detail by taking reference to accompanying FIGS. 1 to 19. Identical or equivalent elements and elements which act identically or equivalently are denoted with the same reference signs. Not in each case of their occurrence a detailed description of the elements and components is repeated.

The depicted and described features and further properties of the invention's embodiments can arbitrarily be isolated and recombined without leaving the gist of the present invention.

Figure 1:
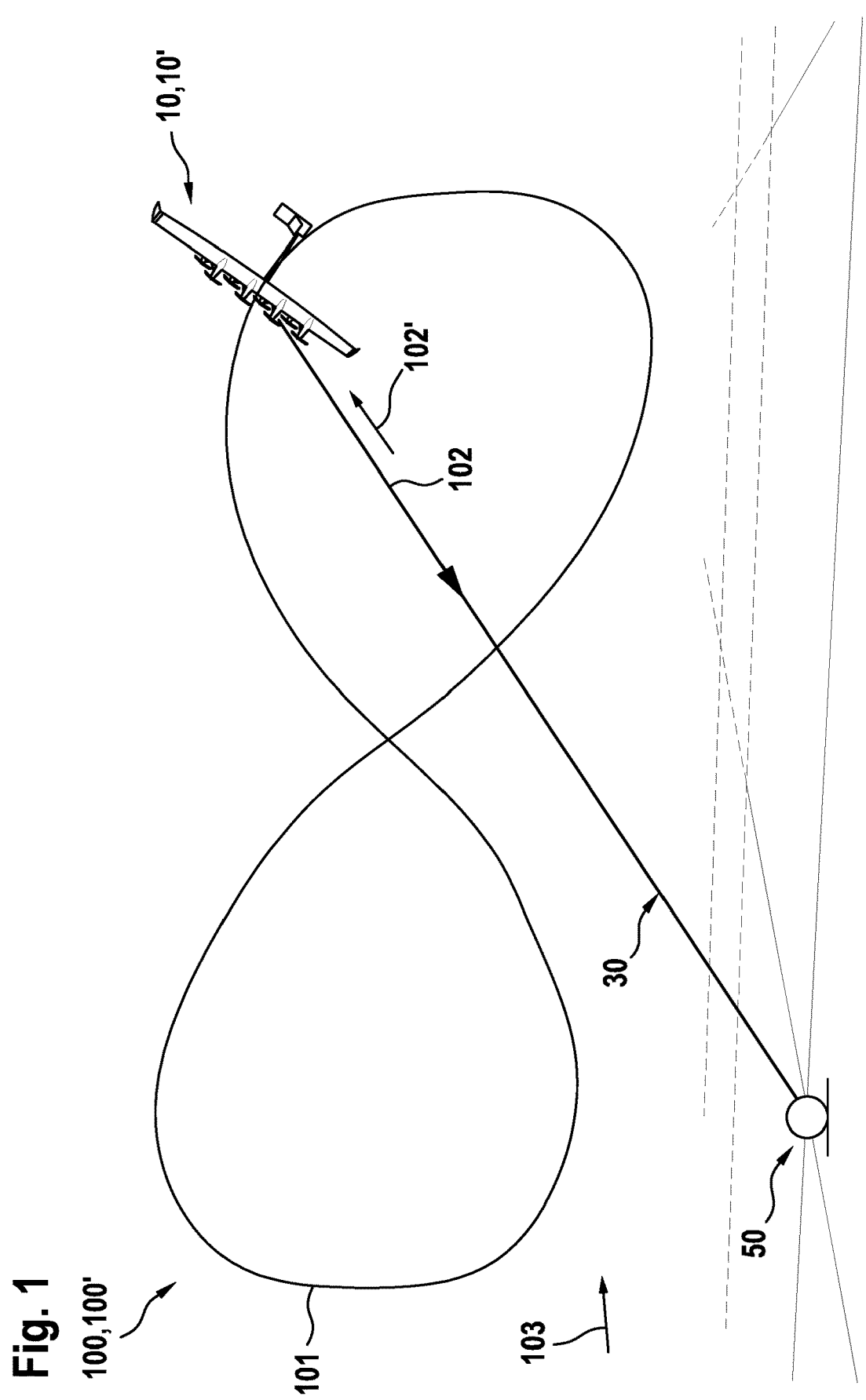
Figure 2:
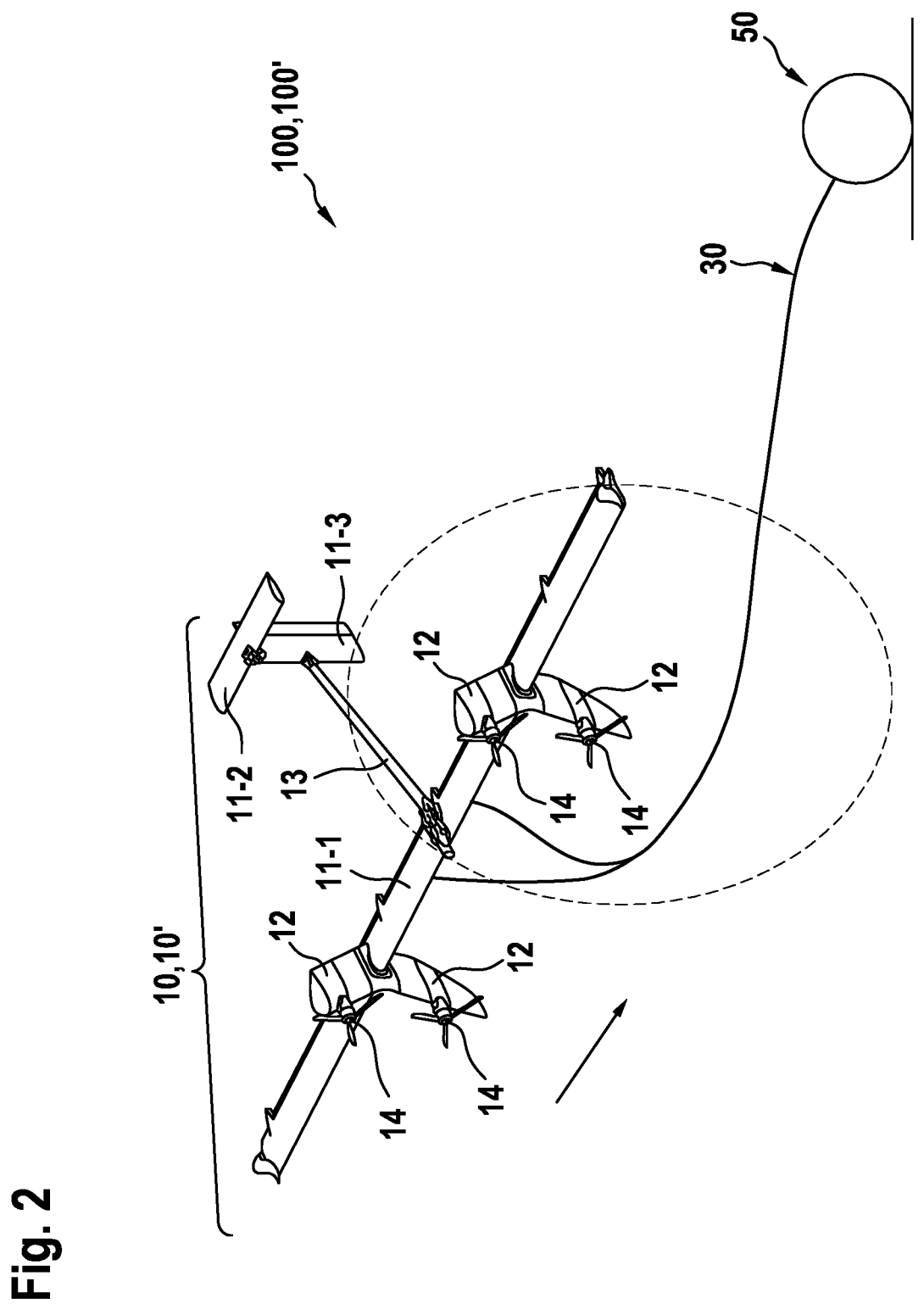
Figure 3:
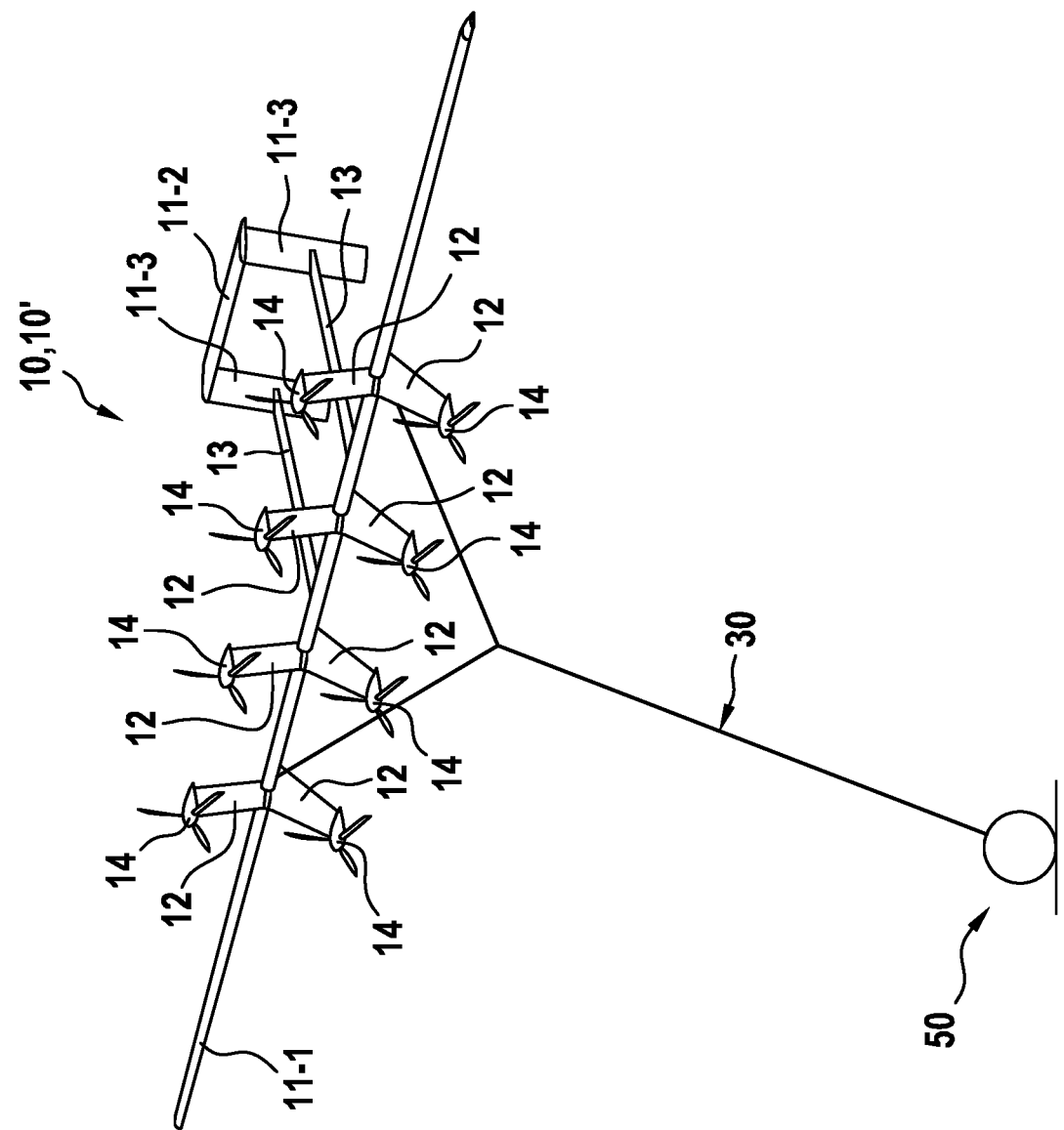

FIGS. 1 to 3 schematically describe embodiments of the airborne power generation system 100 according to the present invention based on different types of underlying airborne units 10 in the form of aerial vehicles 10' formed as kites 10'.

Each of the airborne power generation systems 100 shown in FIGS. 1 to 3 comprises an airborne unit 10 as such, in particular in the form of an aerial vehicle 10', for instance a kite 10', a ground unit 50 which is also referred to as a ground station, and a tether and coupling unit 30 configured to carry the mechanical load as well as for transmitting electrical power between the airborne unit 10 and the ground unit 50.

As can be seen from FIGS. 1 to 3, the airborne unit 10 may be formed as an aerial vehicle 10' and in particular as a kite 10'. The kite 10' is formed by a frame 13 having a front region with a main wing 11-1 and auxiliary wings 11-2 and 11-3 at an opposite or rear region.

The main wing 11-1 is equipped with plural motor/generator units 12 to which mechanically coupled rotors 14 are assembled.

In a motor operation mode of the airborne power generation system 100 the tether and coupling unit 30 is used to provide electrical power in the direction 102' from the ground station 50 to the kite 10' in order to operate and use the motor/generator units 12 on the kite 10' as motors thereby using the rotors 14 as propellers in order to controllably fly the kite 10', for instance during launching and landing.

If certain wind conditions are fulfilled after launching, the kite 10' may be directed to a certain kind of wind harvesting trajectory 101. After having entered such a trajectory 101, the operation mode can be switched from the motor mode to the generator mode upon which the rotors are driven to rotation by the flow 103 of the wind. In the generator mode the rotation of the rotors 14 is used to drive the motor/generator units 12 as generators in order to thereby convert wind power into electrical power which can be transferred by the tether and coupling unit 30 in the direction 102 to the ground station 50.

Figure 5:
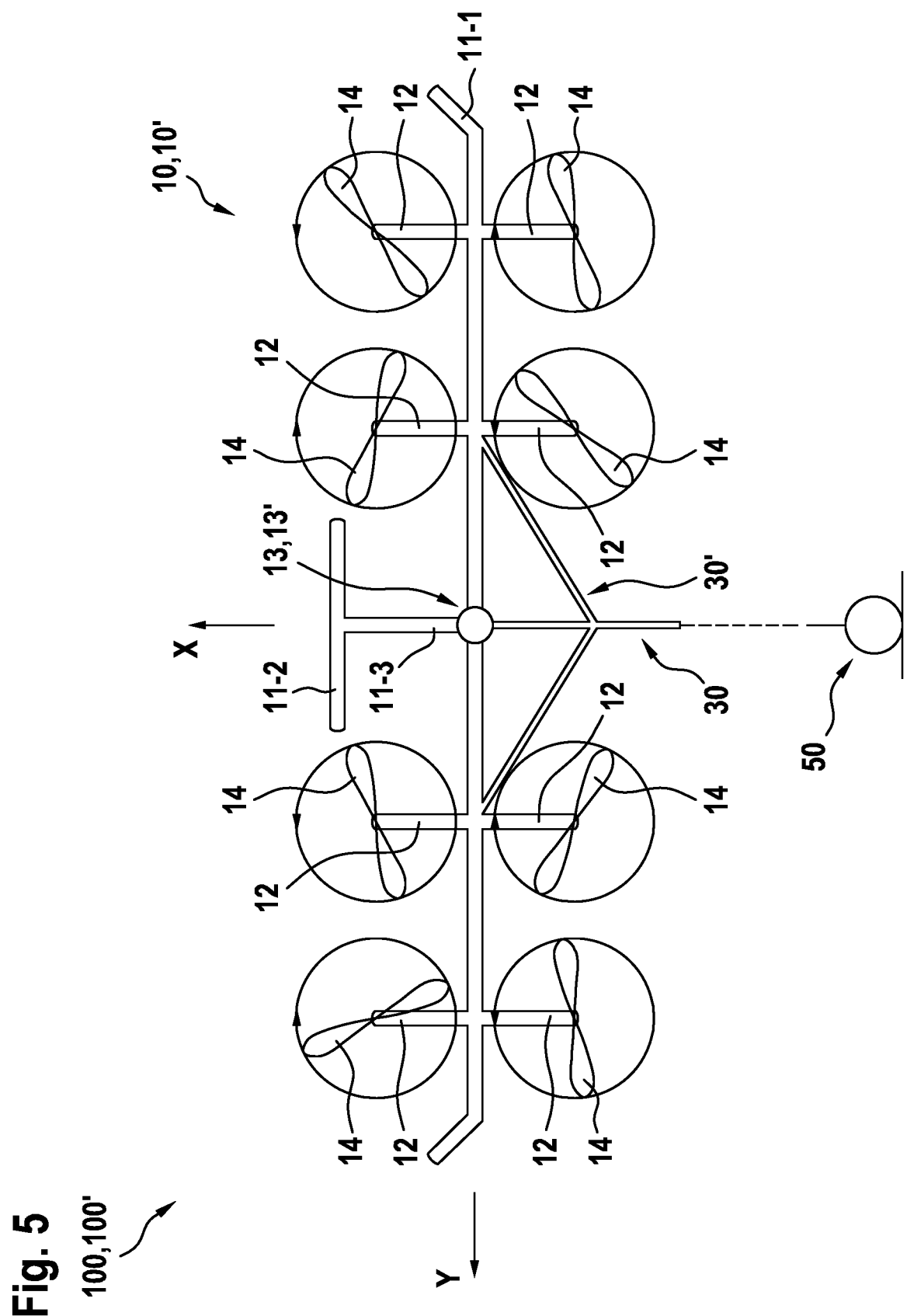
FIG. 5 is a schematic front view of still another embodiment of the airborne power generation system.

FIG. 5 gives a schematic front view of a further embodiment of the airborne power generation system 100 elucidating the arrangement of the motor/generator units 12 and of the rotors 14 in relation to the frame 13 and the center of mass 13' of the kite 10'.

Figure 4:
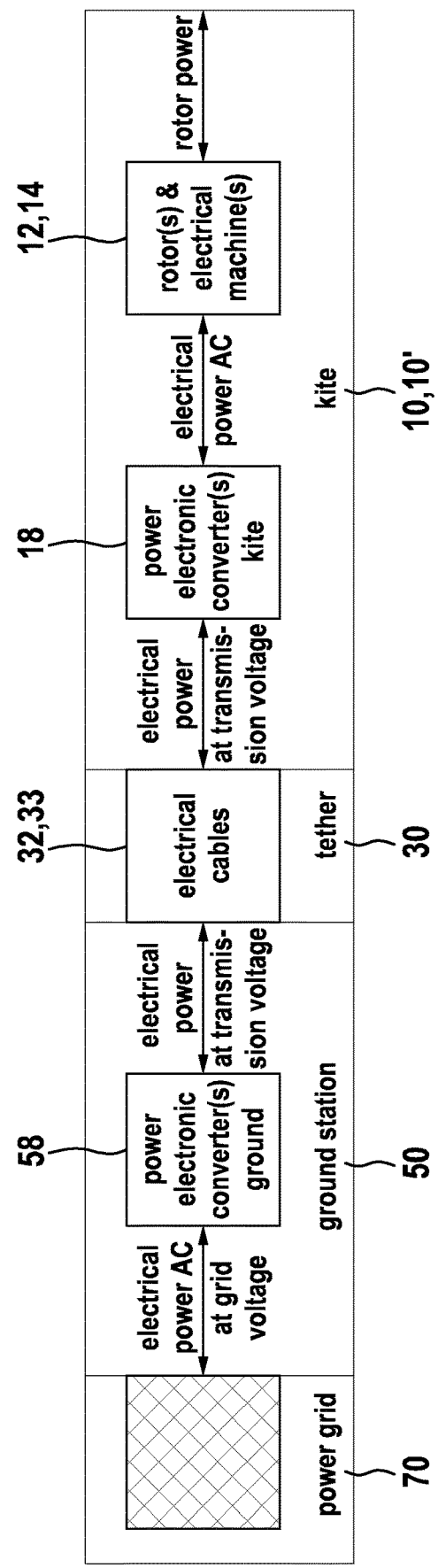
FIG. 4 is a block diagram depicting a further embodiment of the airborne power generation system according to the present invention.

FIG. 4 is a block diagram depicting a further embodiment of the airborne power generation system 100 according to the present invention. Here, the connection to the power grid 70 for feeding electrical power obtained by converting wind power is demonstrated.

In addition, it is made clear that at the kite site power electronic converters 18 are useful in order to convert electrical power—which is obtained from the wind power and which may be AC power—into a suitable voltage range and polarity distribution, for instance to a DC or an AC scheme for transmission along cables 32, 33 comprised by the tether and coupling unit 30.

On the other hand, at the ground station 50 power electronic converters 58 may be provided, too, in order to convert electrical power transmitted by the tether and coupling unit 30 and its electrical cables 32, 33 into a suitable voltage range and polarity scheme, for instance into AC power suitable to be fed into a power grid 70 or to be stored in an energy storage means (not shown).

Figure 6:
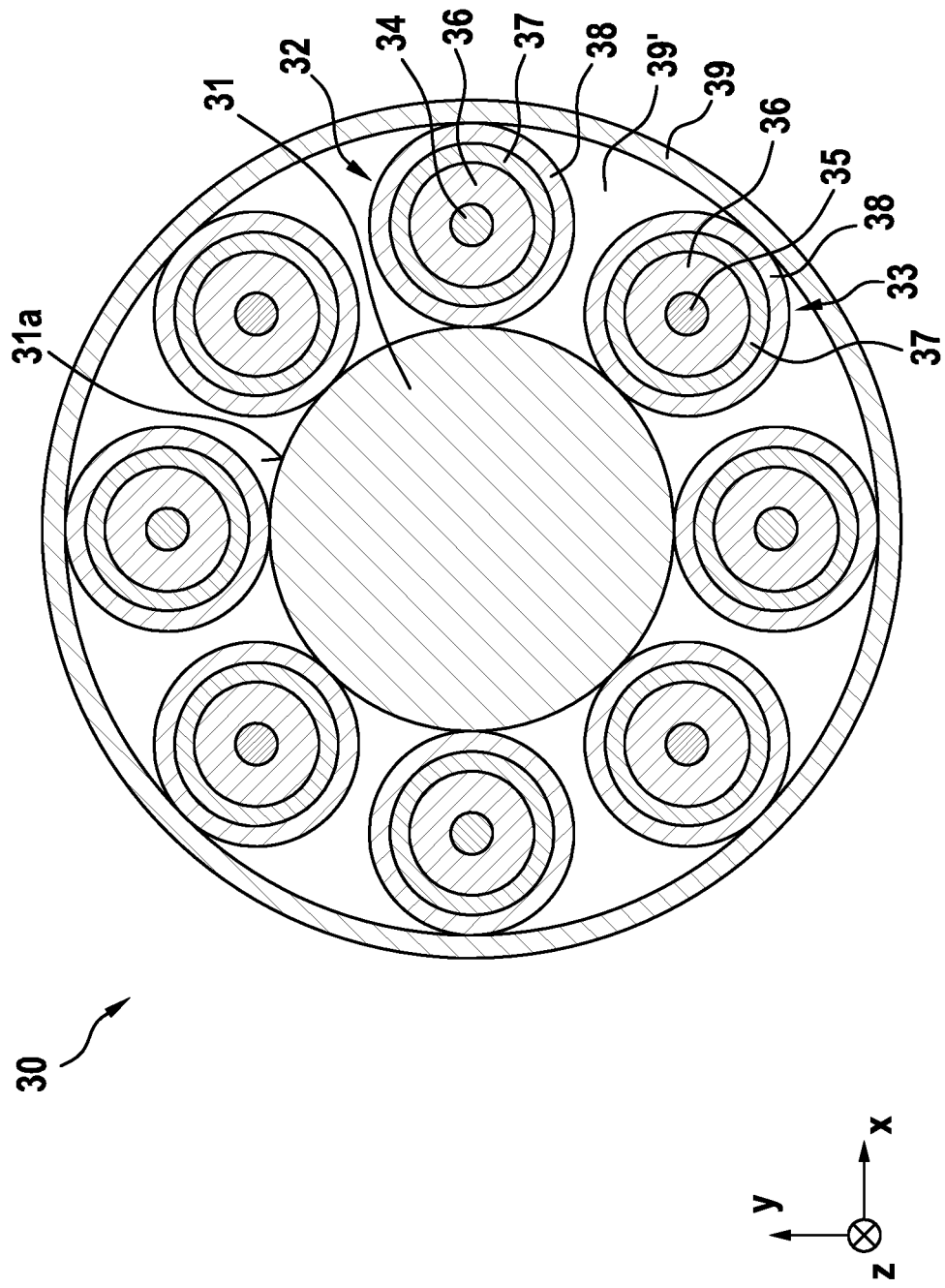
FIG. 6 is a cross-sectional view representing a coupling and tether unit that may be involved in an embodiment of the airborne power generation system according to the present invention.

FIG. 6 is a cross-sectional view representing a coupling and tether unit 30 that may be involved in an embodiment of the airborne power generation system 100 according to the present invention.

The innermost portion of the tether and coupling unit 30 is formed by a core 31 which serves as the main mechanical load carrier. On the circumferential surface 31a of the core 31 first and second cables 32 and 33 are aligned in the z direction also indicated in the frame of reference xyz shown in FIG. 6.

Each of the cables 32 and 33 extends essentially along the z direction, too, and comprises as an innermost portion a litz wire 34, 35 for transmitting electrical power along the cables 32, 33. The litz wire 34, 35 is surrounded by an insulator 36, followed by a shield 37 (which may be grounded to earth) and by a cable jacket 38 as the outermost portion.

The arrangement of the core 31 having aligned on its circumferential surface 31a cables 32 and 33 is surrounded by a tether jacket 39. The remaining inner space 39' inside the tether jacket 39 may be filled with an appropriate filling material. The filling material and any other material of the tether and coupling unit's 30 components may be chosen to be flexible enough in order to allow bending and/or winding up of the tether and coupling unit 30 on a roll, a winch or the like.

The litz wires 34 and 35 may be assigned to different polarities depending on the specific applications of the tether and coupling unit 30.

Figure 8A:
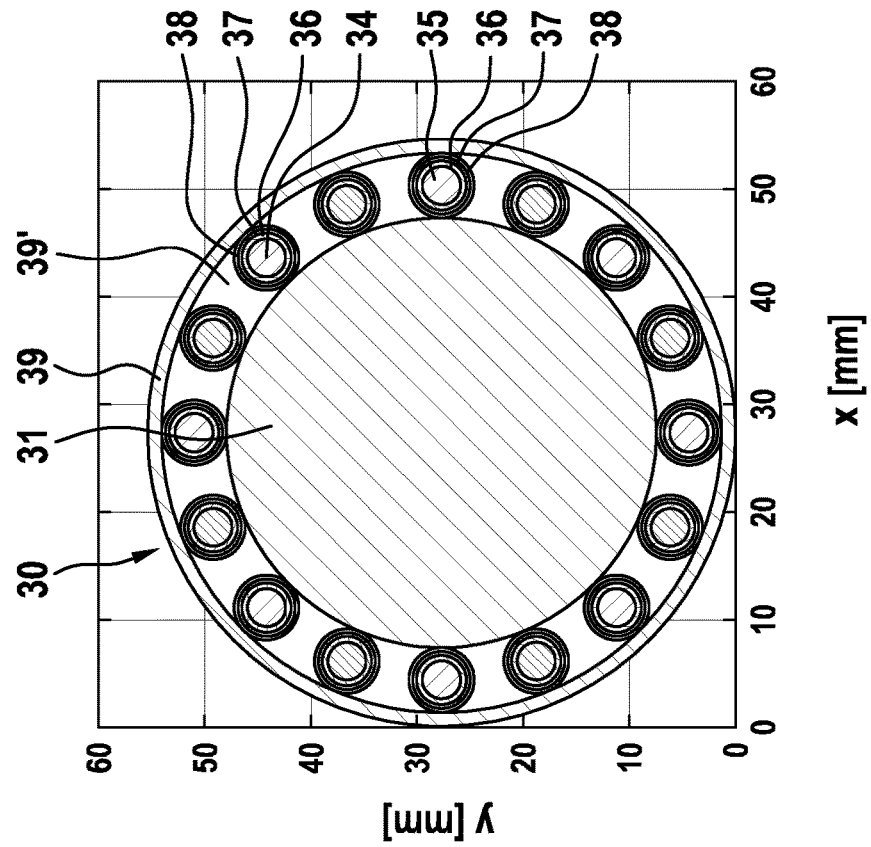
FIGS. 8A, 8B are cross-sectional views describing coupling and tether units that may be involved in embodiments of the airborne power generation system according to the present invention.
Figure 8B:
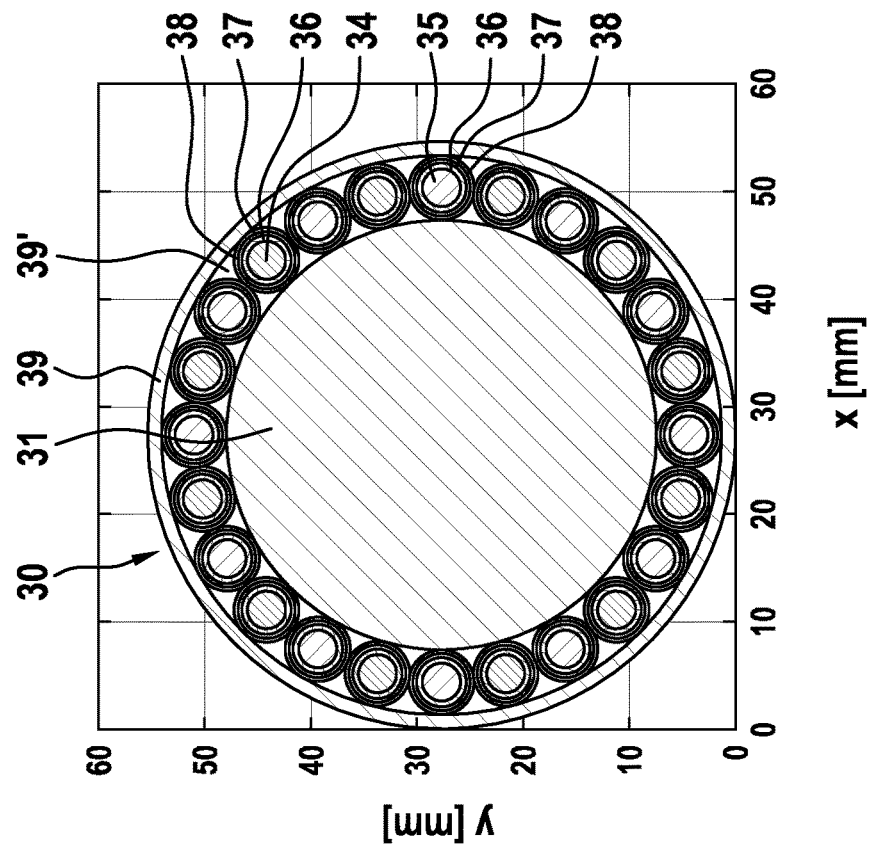

The aspects in connection with the cross-sectional properties of the tether and coupling unit 30 can also be obtained from FIGS. 8A, 8B and 12, together with indications with respect to their actual dimensions.

Figure 7:
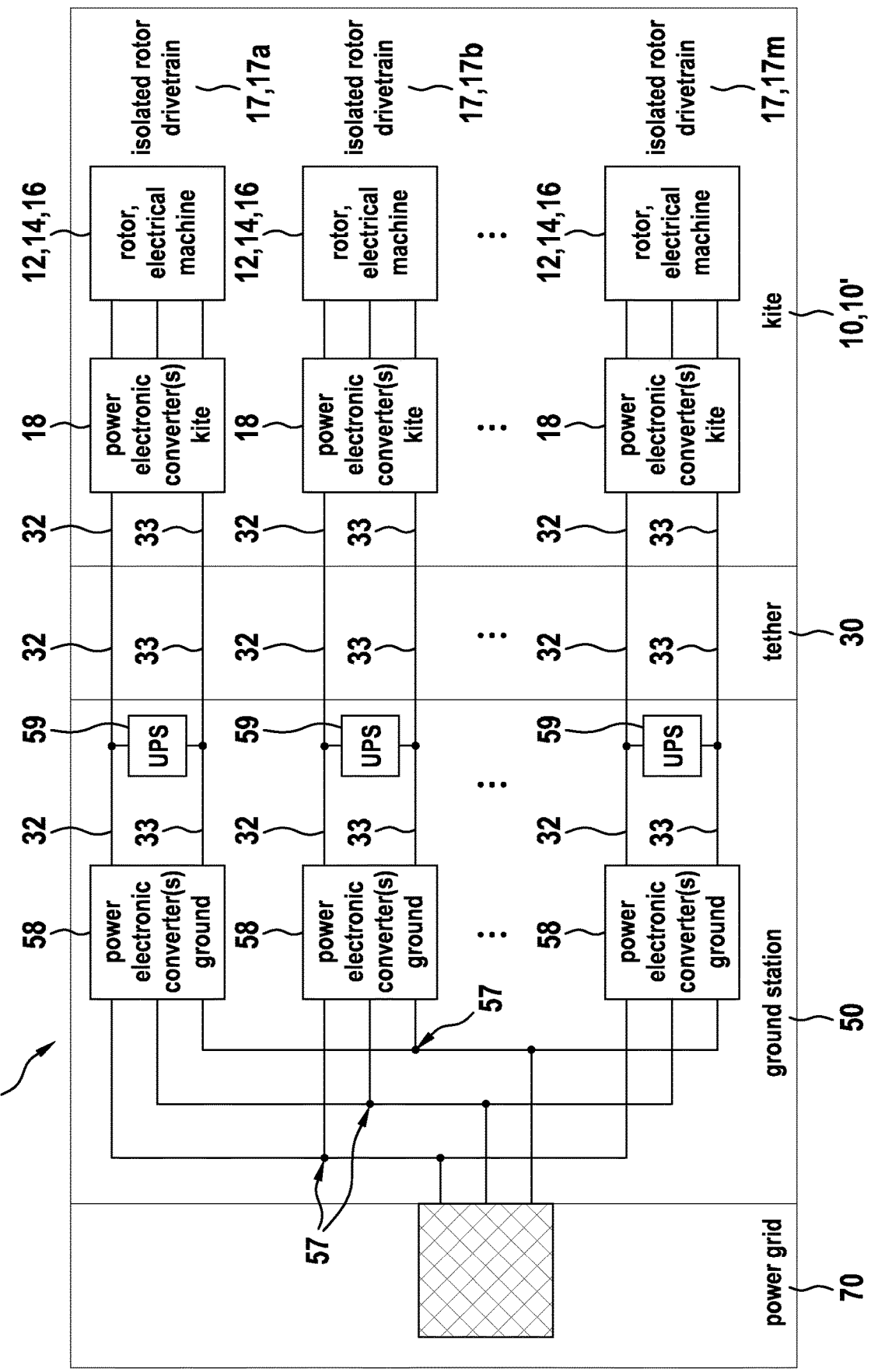
FIG. 7 is a more detailed schematic block diagram of an embodiment of the airborne power generation system according to the present invention.

FIG. 7 is a more detailed schematic block diagram of a further embodiment of the airborne power generation system 100 according to the present invention.

It can be seen that in the embodiment shown in FIG. 7 each group 16 of motor/generator units 12 comprises a single motor/generator unit 12 which is driven by wind power in the generator mode by means of the mechanically coupled rotor 14. In the motor mode, each single motor/generator unit 12 drives the mechanically coupled rotor 14 as a propeller, e.g. for launching, hovering and/or landing.

Also evident from FIG. 7 is the provision of an uninterruptible power supply unit 59 which may be used in the motor mode of the airborne power generation system 100 in order to drive the rotors 14 mechanically coupled to the respective motor/generator units 12 for controllably launching, hovering and/or landing the kite 10' as an airborne unit 10.

FIG. 7 makes evident the inventive concept according to which each of the groups 16 of motor/generator units 12 is electrically and/or galvanically uncoupled from any other group 16 of motor/generator units 12. This is demonstrated by having no electric interconnection between the groups/pairs of cables 32, 33 assigned to each group 16.

It is the power grid side section of the ground station 50 which is configured to join all the separated groups of cables 32, 33 assigned to the uncoupled groups 16 at respective connection nodes 57, in particular located following uninterruptible power supply units 59 of the ground station 50 at a side opposite to the coupling and tether unit 30.

As in the embodiment shown in FIG. 4, at the kite site and at the ground station site power electronic converters 18 and 58, respectively, are provided in the embodiment of FIG. 7. In addition, each of the drivetrains 17, 17a, 17b, . . . , 17m for each group 16 is provided with an uninterruptible power supply unit 59 for realizing the motor mode controllably driving the motor/generator units 12 for controllably launching, hovering and/or landing the airborne unit 10, in particular also during a failure inside the power grid 70.

Figure 9:
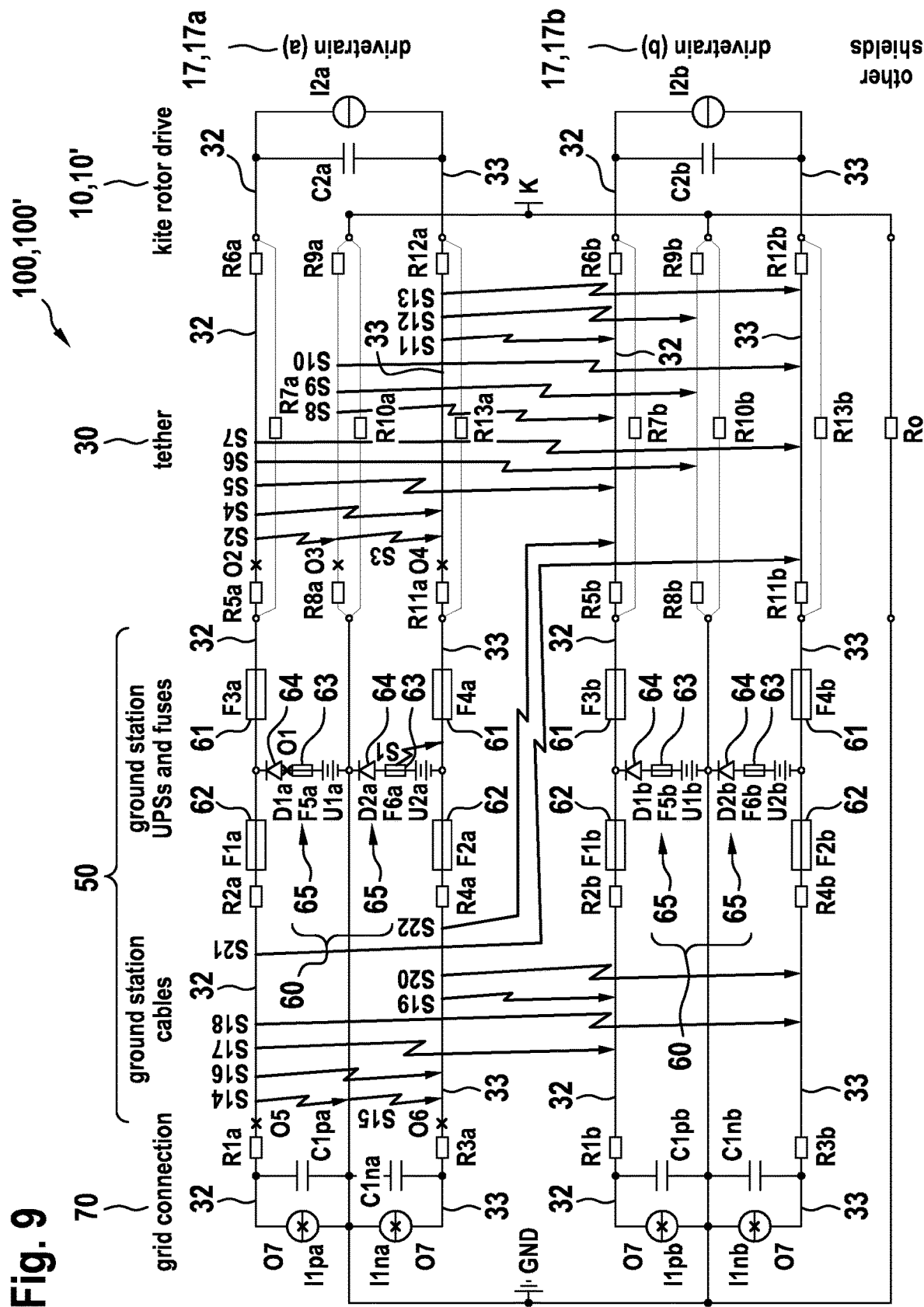
FIG. 9 shows an equivalent circuit of an embodiment of the airborne power generation system according to the present invention with a particular focus on a fuse system.

FIG. 9 shows an equivalent circuit of an embodiment of the airborne power generation system 100 according to the present invention with a particular focus on the fuse system 60 which is formed by pairs of fuse units 65 as over-current shut-off units.

Each fuse unit 65 connects an assigned cable 32, 33 to a line carrying a ground or reference potential GND and/or a reference potential K of the underlying kite 10'. Therefore, in each cable 32, 33 the first and second fuse elements 61, 62 are connected in series. Between the first and second fuse element 61, 62 a connection node is situated. To this connection node a third fuse element 63 and a diode element 64—which are connected in series—are connected in parallel making contact to the line carrying the reference potential K or ground potential GND.

This configuration is established for all the drivetrains 17, 17a, 17b, . . . , 17m of the system 100. In each case, the diode element 64 is connected in reverse direction relatively to the potential difference of the potential given on the respective cable 32, 33 relative to the ground potential GND or reference potential K.

FIG. 10 gives certain operation parameters by means of parameter tables.

Figure 11:
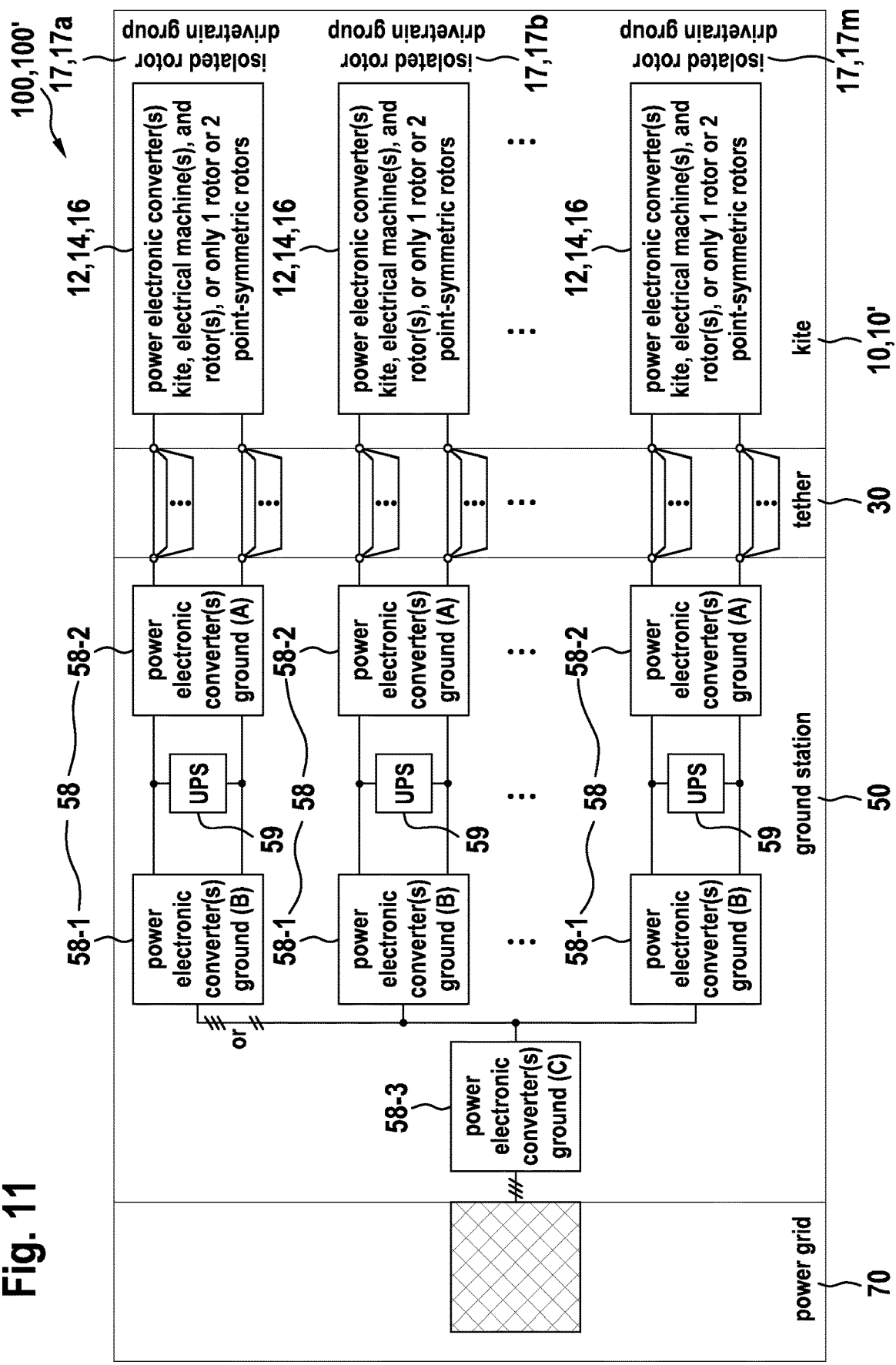
FIG. 11 depicts a schematic block diagram, wherein according to a further preferred embodiment of the airborne power generation system according to the present invention plural motor/generator units are embraced within respective groups of motor/generator units.

FIG. 11 shows a schematic block diagram, wherein according to a further preferred embodiment of the airborne power generation system 100 of the present invention plural motor/generator units 12 are embraced within a respective group 16 of plural motor/generator units 12.

As already explained above, FIG. 12 is a cross-sectional view representing a coupling and tether unit 30 that may be involved in an embodiment of the airborne power generation system 100 according to the present invention with a particular focus on the assignment of the polarity of potentials of directly adjacent cables 32, 33.

FIGS. 13 to 19 elucidate by means of equivalent circuits and graphs showing states, currents and voltages different operation modes which are configured to handle certain operation faults in connection with airborne power generation systems 100 and methods according to the present invention.

These and further aspects of the present invention will also be described in detail in the following:

Overview

The present invention in particular refers to fault tolerant power electronic systems for airborne power generation systems 100 or airborne wind power conversion systems formed as drag power kites 100.

With the present invention an approach for fault tolerant power electronic systems for airborne systems 100' is disclosed. The key idea is to use a plurality and in particular a high number of electrical cables 32, 33 in a tether 30 underlying an airborne wind power conversion system 100, in particular a drag power kite and to leave rotor drivetrains 17 in groups electrically isolated on the kite's airborne system 100', namely in the kite 10' as such, in the tether 30 and on the ground station equipment 50.

The power flow is parallelized behind an uninterruptible power supply of each drivetrain group 16 on the ground. This approach hardly affects the overall system performance e.g. due to the anyway high optimal number of electrical cables in the tether 30. By this approach, an electrical and/or functional fault in one drivetrain group 16 does only affect the same drivetrain group 16 and a fault between two drivetrain groups 16 only affect the same two drivetrain groups 16.

A fuse system 60 and a fault shut-off control for the power converters is proposed, with which also faults between two drivetrain groups 16 at most lead to unavailability of only one drivetrain group 16. In particular also open circuit faults and short circuit faults in the tether are mitigated, are overall not harmful for the system and a usual multicopter-like landing is still possible. Therefore, the proposed power electronic system design has no single point of failure. A generalization and a number of variants are discussed. In detail, a number of power electronic topologies and both tether power transmission types, DC and AC, are possible. In all cases any open circuit fault and any short circuit fault at most leads to unavailability of only one rotor drivetrain group 16.

Motivation

Besides tower based wind turbines for converting wind energy into electric energy so-called drag power kites 10' as airborne units 10 have been developed in order to carry airborne turbines 14 on a kite or the like. In the sense of the present invention, kites 10' are referred to as tethered wings and they became promising alternatives to harvest wind energy.

As shown in FIGS. 1 to 3, a kite 10' is flown in crosswind trajectories 101 like figure eights or circles. The considered kite 10' has onboard and thus airborne wind turbines 14 and generators 12 to generate electrical power.

In order to reduce aerodynamic losses and the mass of the tether 30, electrical power is transmitted to a station 50 on the ground via medium-voltage electrical cables 32, 33 integrated in the tether 30.

Due to the high speed of the kite 10', the airspeed at the kite 10' is about a magnitude higher than the actual wind speed, so that the onboard turbines 14 may be small compared to tower based turbines.

Before the kite 10' flies in crosswind trajectories 101, the generators 12 and wind turbines 14 are operated as motors and as propellers, respectively, e.g. in order to perform a vertical take-off and a subsequent transition into crosswind flight. The reverse procedure is used for landing when the wind calms down, for maintenance or any other intermittent of generation of electric power.

Such an airborne wind energy concept is called "crosswind kite power" or "drag power" or sometimes also as "onboard-", "continuous power generation", "fly-gen" or "airborne wind turbine", whereby here, this latter term is used for an onboard wind turbine of a drag power kite.

Compared to conventional wind turbines, crosswind kite power promises harvesting wind energy at higher altitudes and with stronger and steadier winds. However, the concept requires only a fraction of the construction material and costs. Hence, it promises to have lower leveled cost of electricity (LCOE). A drag power kite with a rated electrical power of 20 kW ("Wing 7") has been developed by the company Makani Power/Google and it has been demonstrated autonomous power generation as well as launching and landing.

Currently, a full-scale 600 kW system ("M600") is being developed, too.

In general, the concept of kite power plant design is a difficult and interdisciplinary challenge. Many studies investigated the control and flight path optimization, but just a few studies investigated the design of the power electronic system. In the sense of the present invention the term "power electronic system" of a drag power kite in particular refers to all power electronics with a high power rating, and not to e.g. DC-DC converters, to supply sensors, control electronics and the like, unless otherwise stated.

It has been shown that a medium-voltage DC power transmission with about 8 kV tether voltage is optimal for airborne wind turbines. In addition, it has been ruled out an AC transmission over the tether, because it can suffer from high reactive currents and thus losses caused by the high capacitance of the electrical cables of the tether. Another reason against AC is that the insulation of the electrical cables must be designed to withstand the peak voltage, which is $\sqrt{2}\approx 1.414$ times higher than the voltage of a DC transmission with the same power and current rating. Hence, AC cables would be thicker.

It has also been investigated whether medium-voltage or low-voltage generators with DC-DC converters are better and decided for the latter.

Another approach proposes an AC transmission possibly with a resonance frequency, wherein the electrical cables in the tether are connected to a transformer and a power electronic converter on the kite. The latter is further connected to an aerial DC bus to which the rotor drives are connected. On the ground, the electrical tether cables are also connected to a transformer, power electronic converters and then to the power grid. The comparable high capacitance of the tether and possibly additional capacitors or capacitances on the kite and/or on the ground and the inductance of the transformers and possibly additional inductors or inductances on the kite and/or on the ground may form a resonant circuit. The power electronic converters may generate a voltage with an AC frequency at the resonant frequency in the magnitude of a few kilohertz. As the transformers decouple the high tether voltage from the power electronic converters with according winding numbers, the power electronic converters as well as the generators can have a low voltage rating.

Therefore, the drawbacks of an AC power transmission may be outweighed.

However, in both of the mentioned approaches, fault tolerance has not been dealt with.

Several rotors and several DC-DC converters were ultimately proposed—instead of e.g. a single DC-DC converter on the kite and on the ground—to obtain some level of fault tolerance through redundancies.

Several rotors and drives are an alternative approach, but the only further detail about fault tolerance adopted so far is that materials may be selected in order to allow for a redundant and/or fault-tolerant design.

However, a high reliability through fault tolerance is considered as a very important design goal, such that a crash of the kite, particularly for a multi-megawatt system with a kite mass of several tons, is the maximum credible accident, which should have only a negligibly low probability of occurrence.

Previously proposed systems do have single points of failures, e.g. a short circuit in the tether cables, with which a landing in multicopter mode would be impossible. Even though it could be possible to obtain a relatively low probability of such a failure e.g. by high quality manufacturing, a more reliable solution is a power electronic system design without a single point of failure.

It has to be noted that batteries onboard a multi-megawatt kite, which are capable to supply the rotors for a multicopter landing, are not an option, because such a high power and energy would be required for which the batteries would be too heavy. Similarly, a hybrid solution e.g. with a gasoline engine might be too heavy and/or too complex.

The entirety of drawbacks as described above is a part of the motivation for the subject matter of the present invention: The results of previous investigations were used as basis in order to extend the power electronic system design with the goal of no single point of failure, and thus with a very high fault tolerance.

In particular, some of the contributions of the present invention can be summarized as follows:

(1) Characterization and problem description of the design of the power electronic system of a drag power kite without single point of failure.

(2) Proposal and investigation of a solution.

(3) Verifications through simulations and experiments.

(4) Discussions to obtain a drag power kite without any single point of failure (besides the power electronic system).

Generalized Electrical Interconnections

FIG. 4 shows a generalized block diagram of the power electronic system 100 of a drag power kite 10' as an airborne unit 10.

From right to left, the following aspects are shown:

(i) Power from the wind is harvested and converted by rotors 14 and multi-phase (usually three-phase) electrical machines 12 (i.e. motors/generators) into electrical power. Rotating field electrical machines (hence multi-phase AC electrical power), in particular permanent magnet synchronous machines, are preferred, as these machines achieve the highest power-to-mass ratio and efficiency compared to other AC or DC-machines.

(ii) The electrical machines are controlled by power electronic converters 18 as shown in the second block from the right in FIG. 4 which may include also further converters, such as DC-DC or AC-DC converters.

(iii) The electrical power from the kite power electronic converter(s) 18 is transmitted via electrical cables 32, 33 in the tether 30—middle block in FIG. 4—at the transmission voltage to the ground station power electronic converters 58, second block from the left.

(iv) The ground station power electronic converters 58 convert the transmission voltage to the grid voltage and may also include grid transformers (50 Hz or 60 Hz) and supply the converted power into the underlying power grid 70, first block from the left in FIG. 4.

The power transmission is bi-directional.

The generality of the paradigm of FIG. 4 has to be noted: It includes all concepts mentioned in the motivation and in connection with the drawbacks of the known configurations, respectively, as well as possibly other concepts e.g. with a series connection or with current source DC power transmission.

Subsystem Failure Modes

In any of the blocks shown in FIG. 4, faults can occur, whereby only the two electrical failure modes of open circuits and short circuits are reasonable. Note that these two failure modes also cover other failure modes which lead to one of those two said failure modes: e.g. a fault in a power electronics converter 18, 58 stops that power electronics converter 18, 58 to operate which is thus like an open circuit, or e.g. an over-voltage can damage an insulation which thus can lead to a short circuit.

There are further possible failures of mechanical nature with effects on the power electronic system, e.g. a rotor break or a tether tear. However, as this invention focuses on the fault tolerance of the power electronic system, these failures are of less interest, but some preventions are discussed below in a later section.

Number and Placement of Rotors

During crosswind flight, the airspeed is usually high enough such that the control surfaces which are usually fault tolerant or redundant themselves can control the kite 10' alone. Therefore, a stable crosswind flight is usually also possible if one or more rotors 14 have a failure and are not available.

However, during hovering, i.e. launching and landing, the rotors 14 are the only or most important actuators with which the kite 10' can be kept airborne and under control. Even if a rotor 14 fails during crosswind flight instead of during hovering, the kite 10' needs to be landed/hovered to the ground station for maintenance. Therefore, for designing a fault tolerant power electronic system, hovering is the worst case and is the only mode that needs to be further considered.

As the kite 10' is a tethered multicopter during hovering, all fault tolerance measures for fault tolerant multicopters can be applied. For multicopters, the higher the number of rotors 14 is, the higher is the fault tolerance and, depending on the system design, possibly even without special measures in the control algorithm.

Moreover, the higher the number of rotors 14 is, the smaller is the percentage of missing thrust and moment, the higher is the rotor efficiency due to lower rotor disk loadings, and hence the lower is the power excess to maintain a gravity-balancing hovering thrust during a rotor failure.

Another important design variable is the placement of the rotors 14 with respect to the center of mass of the multicopter or kite 10' and their rotation direction, being it clockwise or counter-clockwise. Usual multicopters have a somewhat symmetrical placement, e.g. in a circle or in two rows as shown in FIG. 5, whereby one or more rotors are placed in each horizontal axis directions—in FIG. 5: +x, −x, +y, −y—some distance apart from the center of mass 13'.

The placement and rotation direction are usually chosen such that an arbitrary three-dimensional moment can be generated by differential angular speeds of the rotors 14. A difference to usual multicopters is that the kite 10' is tethered. Therefore, the kite 10' should always pull (slightly) on the tether 30 via a (small) pitch angle such that the tether is always under tension. Therefore, the tether 30 does not drag on the ground and tether angle sensors may be used. If a Y-shaped bridling 30' as in FIG. 5 is chosen to connect the tether 30 to the kite 10', movement about the vertical axis is constrained (or more precisely, there is a restoring tether bridling moment if the yaw angle does not coincide with the azimuth angle), with which the rotor moment about the vertical axis and thus the rotor rotation directions might be irrelevant and all rotors 14 can even rotate in the same direction.

Many rotor numbers and placements are possible.

However, with the discussion above, and to obtain a level of fault tolerance where at least one rotor can fail, a meaningful number of rotors 14 is six, eight or a higher even number. Moreover, in a symmetrical design any rotor 14 has a counterpart rotor 14 which is disposed point-symmetrically with respect to the center of mass 13', as shown in FIG. 5. This allows for a conservative estimation: If one rotor 14 fails, the counterpart rotor 14 needs also to be turned off to balance the moments. The thrusts of the remaining rotors 14 are increased to compensate the missing thrust to maintain hovering. This estimation also allows that any two point symmetrical rotors 14 can fail simultaneously. According to the present invention, a kite dimensioning may be considered in which the excess thrust and power at least in the first mentioned rotor fault case or in these two rotor fault cases are available.

Drag Power Kite Tether

FIG. 6 shows a considered design of a kite tether 30. The tether 30 comprises
  a mechanical load carrying core 31, made of a material with a high strength-to-weight ratio such as Dyneema,
  electrical load carrying cables 32, 33 arranged around the core 31 in a helix along the tether 30, with positive litz wires 34, negative litz wires 35, insulation 36, grounded shield 37 (which is possibly "half-conducting") to control the electric field and possibly to ground the kite's frame, and jacket 38 for mechanical protection of the shield 37/electrical cable 32, 33, and
  an outer jacket 39, for mechanical and weather protection of the tether 30.

It has to be noted that also for AC two electrical cables 32, 33 are needed, for which arguable better labels might be "life wires 1 and 2". However, for sake of simplicity, "positive and negative wires" are used as synonyms throughout the description.

The voltage between a positive and a negative electrical wire 32, 33 is the transmission voltage, but for a minimal insulation width the transmission voltage is "centered around ground", i.e. the voltage rating of one electrical cable is only half of the transmission voltage (plus safety margin) and the transmission voltage of an electrical cable against ground is either plus or minus half of the transmission voltage. Under stress, the core strains and constricts. Due to the latter and the helical placement of the electrical cables 32, 33, the electrical cables 32, 33 can follow the strain like a spring with low stress. The tether jacket 39 is assumed to be flexible enough under strain. In-between the electrical cables 32, 33, also optical and/or conductive communication cables can be placed. Around the core 31 an additional strain-relief layer could be placed.

The tether's aerodynamic drag is proportional to the tether's diameter but independent of the airflow direction, because the cross section of the tether 30 is round, which allows the tether 30 being easily wound on a drum.

A model for the exact tether dimensions can be derived, e.g. based on the desired rated strength, rated voltage, rated electrical power and rated electrical transmission efficiency.

Problem Formulation

With the discussion as given above, the fault tolerant power electronic system design problem can be formulated as follows: It is an aim underlying the present invention to provide a power electronic system design (or -topology/-interconnections) in which (R1) a bi-directional power transmission with a medium-voltage in the electrical cables 32, 33 in the tether 30 is possible, (R2) a short circuit current in any component is stopped to prevent further failures such as a fire, (R3) during a short circuit and after its mitigation (e.g. by a fuse or by an over-current shut-down) the voltage in all electrical wires 32, 33 remain within the maximum safe design voltage, and (R4) the end effect of a fault (open or a short circuit) and its mitigations only lead either to:

(R4-a) no rotor 14 is unavailable in motor mode, (R4-b) any single rotor 14 is unavailable in motor mode, (R4-c) any two point-symmetric rotors 14 w.r.t. the center of mass 13' are unavailable in motor mode, or (R4-d) any two rotors 14 are unavailable in motor mode, if the power and thrust of the drivetrains 17, 17a, 17b, ..., 17m is so large, that stable hovering is still possible in such a fault case.

Note that the worst case in requirement (R4-d) is that two neighboring rotors 14 far away from the center of mass 13' fail, i.e. e.g. the two leftmost rotors 14 in FIG. 5 fail, by which also the two right most rotors 14 have to be turned off to balance the moments in a conservative estimation.

Therefore, if only eight rotors 14 are considered, half of the thrust and power can become unavailable. However, the required high thrust and power, or vice-versa the required high number of rotors 14, to fulfill requirement (R4-d) might be impractical in a drag power kite plant realization. Therefore, also a solution without requirement (R4-d) is desirable.

Basic Idea—Isolated Drivetrains

As shown in FIG. 6, a number of electrical cables 32, 33 are integrated into the tether 30, whereby a relatively high number of cables 32, 33 is meaningful such that the tether 30 has a small diameter. The key idea of the proposed solution is to not connect together all of the positive cables 32 to one single positive potential and all of the negative cables 33 to one single negative potential, respectively, neither on the kite nor on ground.

Instead, as visualized in FIG. 7, one electrical cable pair is part of a single rotor drivetrain 17, 17a, 17b, ..., 17m: Here, only the special case of a DC transmission and parallelized power flow at the AC-grid is considered, but the concept is generalized below in the section describing plural motor/generators 12 in a group 15.

In FIG. 7, each isolated drivetrain 17, 17a, 17b, ..., 17m consists of a rotor 14, an electrical machine 12, AC-DC converters 18 and, in case of low-voltage electrical machines, possibly DC-DC converters, to which electrical cables 32, 33 of a pair of cables of the tether 30 are connected. On the ground station 50, each pair of electrical cables 32, 33 is connected to its own uninterruptible power supply unit (UPS) 59 and its own ground station power electronics converter 58, before the power flow is parallelized for the injection into the AC-power grid 70.

In a preferred embodiment, a block "ground station power electronic converter(s) ground" includes a potential isolation, most practical by a grid-frequency or medium-frequency transformer to obtain constant tether transmission voltages against ground. Obviously, with this approach, each rotor drivetrain is isolated (electrically insulated) from all other rotor drivetrains.

For this concept, the following drag power kite plant design measures are necessary:

(i) The number of electrical cables in the tether is constrained to twice the number of rotors.

(ii) More electrical cables 32, 33 on the kite 10' are needed, as each rotor drivetrain 17 is connected to the tether 30 instead of to a single high-voltage bus.

(iii) A UPS 59 for each rotor drivetrain 17 is installed on the ground.

However, these measures and their effects on the system performance and costs can be evaluated as minor, if not negligible:

(i) FIG. 8a visualizes the cross section design of a tether 30 with dimensions for a multi-megawatt kite 10' based on the parameters in the table 1 shown in FIG. 10. FIG. 8b shows the tether with same ratings but $n_c$=16 electrical cables, to consider "isolated drivetrains" with eight rotors for a kite similar to FIG. 5. As highlighted in table 1 of FIG. 10, the tether diameter is hardly increased and the tether mass is even decreased.

Moreover, it can be shown that the number of electrical cables 32, 33 in the tether 30 has only a low sensitivity on important figures of merit of the kite power plant.

(ii) The electrical cables 32, 33 onboard the kite 10' are short enough such that the additional mass and complexity is small, if not negligible.

(iii) A UPS 59 on the ground unit 50 is needed anyway in order to hover the drag power kite 10' to the ground station during a grid fault. With the proposed solution, the power and energy rating a single UPS would have is just split into smaller UPSs 59. However, neither the power nor energy rating, which define the costs of a UPS, need to be changed. Note, that the UPSs 59 are placed on ground and therefore their mass is irrelevant and thus can consist e.g. of low-cost and heavy lead acid batteries.

Fuse System and Control Approach

With the proposed solution in FIG. 7, faults inside any drivetrain 17 affect only the same drivetrain 17, e.g. a short circuit in a machine winding or in a power electronic component, and faults between any two drivetrains 17 affect only those two drivetrains 17, e.g. a short circuit between a wire of one and another rotor drivetrain 17.

Therefore, with according straightforwardly placed fuses 61-63 or any other over-current shut-offs, in the worst case only any two drivetrains 17 become unavailable.

Concluding, if the power and thrust of the drivetrains 17 is large enough that stable hovering is still possible even if two neighboring rotors far away from the center of mass fail, then all requirements (R1) to (R4-d) are already fulfilled.

However, as mentioned in the section describing the problems to be solved, it is desired that requirement (R4-d) can be dropped.

Therefore, a fault between two drivetrains must lead at most to unavailability of only a single rotor 14, because that two drivetrains 17 might be not point-symmetric with respect to the center of mass 13', and unavailability of both rotors 14 might thus not fulfill requirement (R4-c).

For this issue, the fuses 61 to 63 or any other over-current shut-off shown in FIG. 9 may be used as detailed in the following subsections.

Hereby, only two drivetrains 17a, 17b and the shields of the other drivetrains 17m are shown and follow the generalization described below in the section plural motor/generator groups 16.

Underlying Assumptions

FIG. 9 shows an equivalent circuit diagram of a proposed fuse system 60 with fuse units 65 and considered faults inside and between two "isolated drivetrains" 17a and 17b, where GND is the ground (earth), K is the kite's frame, I1p # and I1n # are the positive and negative current sources of the power electronic converter(s) on ground closest to the tether 30, I2 # is the current source of the power converter onboard the kite closest to the tether 30, C # is a (filter) capacitor, R # is a (parasitic) resistance, F # is a fuse, D # is a diode, U # is a UPS voltage source (drawn as battery), short circuit faults are enumerated with S # and open circuit faults are enumerated with O #.

The circuit diagram in FIG. 9 and the derived fuse system 60 in the next subsections are based on some assumptions which are highlighted and justified as follows:

Assumption 1: The ground power electronic converter(s) 58 and the kite power electronic converter 18 closest to the tether 30 behave like controlled DC current sources in parallel to a capacitor.

Indeed, a power electronic converter 18, 58 or the combination of power electronic converter 18, 58 and machine have filter capacitors and an inductance which is a current source. Moreover the currents are controlled by a pulse width modulation (PWM) with a usually high PWM frequency. Therefore, assumption 1 can be justified.

Assumption 2: Parasitic capacitances, parasitic inductances and parasitic resistances are negligibly small.

For the design of a fuse system 60, this assumption can be justified, because the parasitics mainly define a short circuit current's settling time, its steady-state value and the value of a temporary over-voltage for an open circuit or a fuse opening event (which however can be limited e.g. with snubbers). As the parasitic resistances in the tether 30 and ground cables can be expected significant, they are drawn in FIG. 9.

Assumption 3: The UPSs 59 are the main short circuit current drivers and a short circuit current is significantly higher than the rated current of ground power electronics converters 58, tether 30 and kite power electronics converters 18.

This assumption is true with the following conditions: (i) Steady-state is reached, i.e. e.g. in short circuit S2 the capacitor C2a is discharged (in this fault to half of the rated voltage; with a possibly very high current, but only for a very short time). Therefore the fuse timings must be slower than such discharge processes. (ii) A UPS 59 consists of a series of connected batteries or low-voltage to high-voltage DC-DC converters (connected to a voltage source such as batteries on the low-voltage side) with according power rating. The latter might be more practical, as a high tether voltage in the magnitude of 10 kV is required, whereas the voltage of a single lead acid battery cell is only ≈2 V and would thus require a very long string. Moreover, the DC-DC converters can keep the tether voltage, e.g. the UPS voltage, more constant, in particular apart from a short circuit and/or almost independently of the load. Those DC-DC converters must then be rated at least for the rated power needed for hovering (steady-state) and to drive a high short circuit current at least for a short time. If the DC-DC converters have enough overloading capability for a short time to drive a high enough short circuit current, they can have the same rated power as a rotor drivetrain.

It has to be noted that assumption 3 simplifies the fuse system design, as the fuses 61 to 63 can be selected to open at a significantly higher current than the rated current and a short circuit current is mainly driven by a UPS 59 while the grid and onboard power electronics behave like open circuits during a short circuit.

Assumption 4: There is only one independent fault at a time.

This is a usual assumption for a fault analysis and can be justified by a very low if not negligible probability of occurrence of two independent faults at (almost) the same time and by considering that the kite 10' is landed and repaired if there is a fault (particularly if the then altered system would have a single point of failure). This is also the reason why only two drivetrains 17a, 17b are drawn in FIG. 9 and are further investigated in the following sections. Note that dependent faults are considered, e.g. if a fuse opens during a short circuit fault, the resulting dependent fault is similar to an open circuit for which the requirements (R1) to (R4-c) must be fulfilled.

Considered Faults

FIG. 9 visualizes the considered open (O #) and short circuit faults (S #). Note that hundreds more faults are possible, but here only representative faults are investigated, e.g. there could be also a short circuit between the cathode of a diode of a UPS and the anode of the battery of the same UPS 59, but it would have a very similar effect as short circuit S1. Note also that it is not relevant at which specific item a fault occurs, e.g. S2 could be close to the ground or close to the kite or even on the ground or onboard the kite 10'. Moreover it is not relevant what caused the fault or how high the probability of that fault is, as the goal is a system design to fulfill requirements (R1) to (R4-c) and therefore without single point of failure, even though e.g. the cross-drivetrain short circuits on ground S17 to S22 are extremely unlikely or even close to impossible with a reasonable routing and ground station design.

Fault Analysis and Derived Fuse Ratings

Obviously the open circuits faults O1 to O7 lead at most to unavailability of only one drivetrain in motor mode. In particular only O2 and O4 make drivetrain (a) unavailable in motor mode, whereas O1 and O3 have no effect and in O5 to O7 the UPSs step in. Hereby, O7 stands for a grid fault by which the power flow of all ground power converters 58 are stopped and all UPSs 59 step in (in motor mode).

To mitigate the short circuit faults, the (relative) fuse ratings in table 2 of FIG. 10 may be used, where IF # is the current through fuse F #, Imax is the maximum expected current during normal operation (including temporary overload and a safety factor, i.e. Imax is significantly higher than the rated current), TF # is the time delay of a fuse, whereby a fuse is considered to open when the "opening condition" is met over the time delay TF #, and Tmin is the minimum time delay which assures that a fuse opens only due to a short circuit current driven by UPSs (cf. assumption 3 and the discussion below), and e.g. that no fuse opens due to a start-up process (e.g. during initial charging of C2 #). Table 2 shown in FIG. 10 originates from analyzing the short circuit faults in FIG. 9: Fault S1 requires fuses F5 # and F6 # near the UPS voltage source. However, those fuses must be slower than all other fuses to isolate faults. E.g. S14 to S16 and S18 to S19 require fuse F1 # or F2 #, both faster than F5 # and F6 #, such that the short circuit current is stopped, but only the grid connection is separated and the UPSs can step in, i.e. the drivetrains would be still available in motor mode. Similarly, F3 # or F4 # must both be faster than F5 # and F6 # for S2 to S4, S6 to S8, S10 to S12.

It has to be noted that the cross-drivetrain short circuits between equal potentials S5, S9, S13, S17 and S20 might be not harmful and have no effect if the voltages of both drivetrains are (exactly) equal. For the cross-drivetrain short circuits in the tether between unequal potentials S7 and S11 (disregarded short circuits to a shield of another drivetrain S6, S8, S10, S12, as shields of both drivetrains are connected to a single ground and are thus similar either to S2 or S3), the timings of F3 # and F4 # must be different, otherwise fuses of both drivetrains would open in S7 and S11, and would thus make both drivetrains unavailable. E.g. S7 would lead to a high short circuit current in F3a and F4b. If F3*a* opens faster than F4*b*, then only F3*a* opens and drivetrain (a) becomes unavailable (and vice versa if F3*a* opens slower than F4*b*). Similarly for S18 and S19, the timings of F1 # and F2 # must be different. Finally, for S21 and S22, the fuses F1 # and F2 # should be faster than F3 # and F4 #, such that the UPSs 59 stay available for a rotor and thus both rotors stay available for motor mode, otherwise one drivetrain would be disconnected from a UPS and would thus become unavailable (which however would comply with the specified requirements). Note that all fuses at equal positions in the different drivetrains have equal ratings, i.e. e.g. F1*a* has the same ratings as F1*b*, F1*c* etc. (cf. table 2 of FIG. 10).

Ground Converter Control

A grid power electronics converter 58, i.e. a current source I1 #, is controlled as follows: During normal operation, the positive and negative voltages, respectively, are controlled to their rated values. With the simplified circuit model in FIG. 9, that voltage controller can be just a P-Controller, whereby the current demanded or generated by the rotor drive onboard the kite is seen as disturbance of the voltage feedback control loop.

If the voltage drops below a threshold longer than a certain time threshold, then the current flow of the according current source I1 # is stopped. This is to stop driving a short circuit current e.g. in case of S14 (although that current, driven by I1*pa*, would be limited to the rated current).

It should be noted, that no over-voltage shut-off is considered for the ground converter control, because the ground converter 58 should always try to reduce the voltage by injecting current into the grid.

Kite Converter Control

The kite converter 18 is considered to be controlled as follows: In normal operation, I2 # simply injects a (positive or negative) current, depending on the demands of the kite's flight and power controllers.

If the voltage exceeds a high-threshold and if the drive is operated in generator mode, then the current is stopped immediately to prevent a further increase of the voltage and possibly damages. This can happen e.g. in fault O2. In a real drive with a three phase AC machine converter, this is done by controlling the torque or the d- and q-currents, respectively, to zero. Note that this is usually possible highly dynamically.

Moreover, the current flow of the according current source I2 # is stopped, if (i) the voltage drops below a low-threshold longer than a certain time threshold, or if (ii) the voltage drops below a shut-off-threshold, or if (iii) the positive wire's and negative wire's voltage against the shield (i.e. kite frame K, or ground GND if there were no parasitics) exceed an imbalance threshold longer than a certain time threshold. This is to prevent further driving a short circuit current, e.g. during generator mode there would be an under-voltage in case of S4 (although that current, driven by I2*a*, would be limited to the rated current) and an imbalance-voltage in case of S2.

It should be noted that the latter might not necessarily be also an under-voltage at kite converter (a) 18, depending on the threshold values, currents and parasitic resistances, which is why the a voltage-imbalance shut-off may be necessary.

One may also find another way to stop a short circuit current in the shields in case of S2 during generator mode. One possibility can be to also place a fuse into the shield (geometrically between F3 and F4 in FIG. 9) and connect GND to the shields only (i.e. move the GND connection to the right of F3 and F4 in FIG. 9). However, a drawback would be that at least one shield fuse can open in case of S2 (and other faults) and therefore the positive and negative potentials of at least one drivetrain can be floating, which can lead to high voltages of the positive and negative wires against the shield, unless further measures are considered (e.g. Ohmic balancing or a sort of active balancing with active components). Due to its complexity, such a solution is not considered here.

Note on Fault Detection

In most fault cases, the fault detection is straightforward: The power flow in most open circuits is interrupted. This is obviously detected by the ground or kite converters 58, 18 and can be communicated to the flight controller via the already existing communication bus for set-values and statuses to schedule a landing. Similarly, many short circuits lead to a fuse opening with which the power flow of the corresponding drivetrain is also interrupted.

Only a few faults could remain undetected, unless further measures are implemented: E.g. open circuit O1 has no effect on the power flow, until that UPS 59 is needed. Moreover, O3 can have no effect as there are other paths of the shield potential. Other possibly undetected faults are short circuits between equal potentials S5, S9, S13, S17 and S20. These faults might not lead to immediate harm or immediate unavailability of a rotor, but can lead to further faults if they remain undetected. In particular short circuits between two shields can be caused by two electrical cables rubbing against each other, which would likely continue, damage the shields, the insulation and ultimately lead to a wire-to-wire or wire-to-shield short circuit. Moreover, short circuits between two positive or two negative wires can lead to a current through the shields, GND or a higher than rated current through a litz wire if the voltages of the affected drivetrains are not exactly equal, which might or might not have further effects, e.g. electromagnetic interference (EMI) or damages. A detection and repair is therefore highly desired, in particular because an additional fault could lead to a single point of failure (e.g. two undetected open circuit faults O1 in two not point-symmetrical drivetrains and then a grid fault O7). A possible approach to detect such faults are measurements of currents and voltages (e.g. including the current through shields and GND), impedance measurements or insulation tests, all of that before kite-launching or online during flight, e.g. S5 could be detected by correlating the measured currents (or/and voltages) on the ground with measured currents on the kite. However, not all such faults might be detectable during flight, e.g. S9. Moreover, an online detection requires the transmission of communication signals, could be faulty itself and in a worst case could cause a single point of failure. Therefore, system integrity checks prior to kite launch (e.g. with the mentioned test approaches), or simple current and voltage measurements and correlations during flight, with which the flight controller is commanded to schedule a landing if a (possible) fault is detected, seem most practical. A further investigation of fault detections is out of scope of this invention and is therefore not further detailed. However, because of the difficulty to detect some faults, the wire-to-wire short circuits are not excluded from the fault tolerant system design/fault protection design and from the fault analysis (i.e. they are considered as dependent faults), even if all electrical cables have shields and thus first S9 or O3 might occur, e.g. if two electric cables in the tether (30) rub against each other.

Generalization to Isolated Drivetrain Groups and Variants

The proposed solution can be generalized as visualized in FIG. 11. In the following this generalization and variants are explained.

Kite Power Electronics and Number of Electrical Cables in the Tether

On the kite's site, instead of only one rotor 14 also two point-symmetric rotors 14 can be connected to a tether cable pair and thus summarized to one "isolated (rotor) drivetrain group". This is possible, because any fault investigated in the section describing the general fuse system and the control approach leads to unavailability at most of only a single drivetrain, however with requirement (R4-c) two point symmetrical rotors 14 are allowed to fail (and also with only one rotor 14 per drivetrain group, the point symmetrical rotor 14 would be turned off anyways, at least in a conservative estimation, as mentioned in connection with the number and placement of the rotors 14).

Therefore, the number of electrical cables must be not twice the number of rotors 14 but equal to the number of rotors 14, or multiples thereof because several cable pairs can be used for a single isolated drivetrain group as visualized in FIG. 11. Note that in the special case of eight rotors 14 and the considered tether design and parameters, the optimal number of electrical cables can actually be used, cf. FIG. 8 and table 1 of FIG. 10. With another number of rotors 14 or other dimensions for the tether 30 but two point or central symmetric rotors 14 in one drivetrain group, at least a number of electrical cables closer to the optimum can be achieved. Moreover, in case of low-voltage machines, either one DC-DC converter for each machine can be considered or a single DC-DC converter for the two point or central symmetrical machines of same rotor drivetrain group 16 can be considered.

Ground Power Electronics

There is a number of possibilities for the choice of the ground power electronic converters 58, which are divided into three parts in FIG. 11 whereby one block could also consist only of electrical cables: E.g. in the baseline design in FIG. 7, the "power electronic converter(s) ground (A)" and "(C)" are just cables, whereas "(B)" contains at least one of a DC to three-phase AC converter and a transformer.

Instead of using DC-DC converters just for a UPS 59 as mentioned in the section elucidating the underlying assumptions, it might be more meaningful to use a bidirectional DC-DC converter for the block power electronic converter(s) ground (A) in FIG. 11, such that the UPSs 59 are connected already to a low-voltage bus. This seems to be particularly meaningful, if the tether voltage is much higher than the grid voltage.

Instead of paralleling the power flow on the AC side as in the baseline design in FIG. 7, the power can also be parallelized on the DC-side left to the UPSs 59 in FIG. 11, i.e. power electronic converter(s) ground (B) are just cables and power electronic converter(s) ground (C). Obviously, the power flow could also be parallelized in another DC or AC voltage bus. In the first, power electronic converter(s) ground (B) would be a DC-DC converter (with or without isolation, i.e. e.g. with or without medium-frequency transformer) and power electronic converter(s) ground (C) would be a DC-AC converter (with isolation, i.e. e.g. with grid-frequency or medium-frequency transformer if there is no isolation in the DC-DC converter).

For the specific choice of the ground power electronics, there are only a few requirements. Ultimately, requirements (R1) to (R4-c) must be fulfilled, which is likely the case if the equivalent circuit diagram in FIG. 9 with the assumptions as discussed above are valid for the chosen topology. In particular, the power flow must be only parallelized left to the UPSs 59 (cf. FIGS. 9 and 11). In case that the block "power electronic converter(s) ground (A)" consists of a power electronic converter (e.g. DC-DC), the fuses F3 # and F4 # could also be counted as part of the power electronics hard- and software, but with the same shut-off behavior as derived in the section describing the fuse system and the control approach.

Moreover, it seems meaningful that the UPSs 59 have a constant potential and therefore there should be an isolation in "power electronic converter(s) ground (B)" or "(C)".

Other Power Transmissions

Besides a DC transmission, also an AC transmission is possible, for which "power electronic converter(s) ground (A)" may be a medium-voltage transformer and an AC-DC converter. As mentioned in the previous subsection, power electronics only need to behave like the equivalent circuit diagram in FIG. 9. Instead of absolute values for the fuse opening conditions, effective values might be more practical in case of an AC transmission.

A three phase AC transmission in a similar way can also be imagined, i.e. three tether cables for each drivetrain would be used instead of two as in FIG. 11. With that, the machine converters or/and DC-DC converters could be placed on ground and thus only (high-voltage) machines are required on the kite. However, as mentioned in the motivation, a three phase AC transmission comes with a number of disadvantages, and if all converters are placed on the ground the voltage frequency in the tether 30 is defined by the machine's speed. Besides that, most sensors and the flight controllers would be placed onboard the kite whereas the controllers of important actuators would be placed on the ground, with which a highly reliable and fast real-time communication would be required. Therefore, three phase transmission approaches are not considered here.

A series connection to avoid DC-DC converters while using low-voltage machines and power electronics to obtain a high tether voltage is not possible with the proposed approach, unless each insulated rotor drivetrain group consists of such a series connection and unless unavailability of any rotor drivetrain group (i.e. unavailability of a relatively high number of rotors) does not lead to uncontrollability of the kite. This would only be possible, if a very high number of rotors 14 would be used. Moreover, if a current source transmission is considered instead of the here considered voltage source DC or AC transmission, adjustments to the fuse system and the control approach are necessary, because a short circuit current would be as high as the rated current and an open circuit would lead to very high voltages.

Electrical Cable Placement in the Tether

To decrease the probability of the cross drivetrain group short circuits in the tether S7 and S11, which lead to unavailability of one rotor drivetrain group, the electrical cables in the tether should be placed in the pattern (+−)(−+)(+−) . . . as depicted in FIG. 12. By that, the short circuits S7 and S11 are (extremely) unlikely (at least inside the tether 30, but with a reasonable routing and measures also on ground and onboard the kite) while short circuits S5 and S13 become more likely as cross drivetrain group faults, which however (likely) do not lead to unavailability of a drivetrain group as described in the section regarding the general fuse system and control approach. Moreover, if an insulating material (e.g. light foam) or spacers are placed in-between the gaps of the electrical cables in FIG. 12, wire-to-wire short circuits in the tether 30 are even more unlikely.

Moreover it should be noted, that faults should generally be made unlikely by good design, manufacturing and quality control.

Brake Choppers

The grid fault O7 has an effect on the kite's flight control during generator mode, because in this fault all rotors 14 stop suddenly generating thrust and therefore the kite's overall drag is suddenly reduced significantly. Note that this fault can occur at any time, including when the kite 10' is diving towards the ground in a circular crosswind flight path. This can lead to a sudden acceleration of the kite which can be a challenge for the flight control system. To mitigate or eliminate that effect, brake choppers should be installed in each rotor drivetrain group 16 onboard the kite 10' (e.g. a small version for low mass) and/or on ground (e.g. a possibly bigger version due to no mass restrictions). Particularly with the latter the full rated power could be turned into heat on ground (for a few seconds, depending on the ratings of the brake resistors) and the flight controller can schedule a normal transition into hovering and landing. As soon as the machines demand power from the ground, the UPSs step in.

If (at least small) brake choppers are also installed in each drivetrain group onboard the kite 10', the turn-off of a rotor 14 e.g. during fault O2 (if that is in the tether) during generator mode would be also less abruptly. However, if such a fault occurs right at the rotor drive power electronics, there would be an immediate shut-off of that rotor 14 anyway, though the abrupt change of the total rotor drag is rather small (e.g. only ⅛ for 8 rotors). Therefore, brake resistors only on ground seem to be the best choice.

Grounding and Power Electronics Topologies

So far it is considered that the cable shields are grounded and that the tether transmission voltage is "centered around ground". Therefore, one UPS 59 and (one part of the) ground converter 58—one for the positive voltage and one for the negative voltage—are considered. Moreover, the voltage of a UPS 59 is (implicitly) considered to be (a bit) lower than the set voltage of a ground converter 58, otherwise a UPS 59 could operate even though there is no fault. This might be an unwanted operation which is also a reason for considering diodes 64 (whereby the diodes can also be the body diodes of power electronic switches like MOSFETs or IGBTs to enable a recharging of the UPSs). Therefore, in the normal operation case, the potentials are defined by the ground converters 58 and in a fault case, where a UPS 59 steps in, at least one potential is defined by that UPS 59. To avoid currents over the shield ("ground loop"), the kite power electronics connected to the tether 30 is considered to be not connected to the shield (or kite frame K, or ground GND), even if that part of the kite power electronics consists of a point whose potential is theoretically or in normal operation equal to the shield, like in series connected DC-DC converters or in a multilevel converter. If there is an isolation within the kite power electronics, the potential of the isolated part can be chosen freely, of course. As mentioned above, an isolation to the grid is necessary in one of the ground power electronic converters 58, if the tether potentials shall be (approximately/nominally) constant and if the grid voltage is AC. Obviously, the part of the ground power electronics connected to the tether 30 requires a topology which behaves like two voltage sources (or more precisely two current sources which control a voltage) connected in series. Here, a possibility is also series connected DC-DC converters without or with isolation or a multilevel converter. Nevertheless, these limitations for the choice of power electronics topologies can be evaluated as modest, because the voltage in the tether 30 is very high for which a modular approach is anyways a usual solution.

If instead for the part of the ground power electronics connected to the tether 30 a topology which behaves like a single voltage source shall be considered, a passive (Ohmic) or active centering could be also possible, but the shut-off control described in the section regarding the ground converter control has to be extended e.g. with a shut-off for voltage-imbalance. Otherwise, the potential in the tether 30 can be increased to and stay at up to three times its rated value (e.g. during S18). Moreover, further measures might be necessary, to fulfill all requirements or to limit the voltages during fault cases.

It is also thinkable to not connect the shield or the kite's frame to ground. However, the danger for testing personnel, already in machine hall tests for prototypes, might be an unacceptable risk, which is why such an approach is not considered here.

Moreover, also electrical cables without shields are thinkable. A similar approach as the proposed solution can be utilized to obtain a fault tolerant system, maybe only with minor adjustments to the fuse system and converter shut-off control. However, the kite frame can only be grounded high Ohmic (which might be an unacceptable risk for testing personnel) or with at least one additional ground wire in the tether 30, and the electrical cable insulation would need to be much thicker or all electrical wires would need to be embedded in materials with similar or same permittivity to sustain the electric field imposed by the voltage in the tether wires, because the electric field might then be not (almost purely) radial from the litz wire 34, 35 anymore. Therefore, also an approach with cables without shield is not considered here.

Fault Tolerant Fuses

A fuse fault is not explicitly considered in the fault analysis and in the fault tolerant system design described in the section elucidating the fuse system and control approach, because a short circuit fault and a fuse fault at the same time would be two independent faults at the same time, which is excluded by assumption 4.

However, to decrease the probability of a false-open or, worse, a false-not-open of a fuse and thus further increase the fault tolerance, redundant fuses, i.e. fuses in parallel or/and in series, can be an option. Though, a false-open leads to one of the covered open circuit faults and a false-not-open likely leads to opening of another fuse, because most short circuit currents go at least through two fuses. An exception to the latter is S1, i.e. at the UPS voltage source it is meaningful to use (at least) two series connected fuses. Moreover, adjustments to the converter shut-off control might be necessary when considering all faults together with any fuse fault.

UPSs

Above, lead acid batteries were considered as UPS voltage-, power- and energy source. Although lead acid batteries are robust, maintenance-free and low-cost—even for a multi-megawatt system they would make only a small fraction of the total costs—also other sources are thinkable including batteries from other materials e.g. lithium, ultracapacitors, flywheels (but must be rotating practically all the time when the kite flies, as a grid fault can happen at any time), fuel cells, gasoline or diesel generators (preferably e.g. ethanol or bio diesel from a renewable source, but also require batteries as such generators need some time to start), gas turbines (preferably with methane or hydrogen from a renewable source, but also require batteries as gas turbines need some time to start), or combinations thereof.

Versatility

The best choice of the kite power electronics converters 18, ground power electronics converters 58 and of the UPSs 59 is likely an economical decision which minimizes costs and complexity. An interesting possibility can also be the use of different types of power electronics topologies and UPSs 59 or manufacturers thereof for the different drivetrain groups, with which a high level of versatility can be achieved and the probability of a common fault or a fault that causes several faults (e.g. programming bugs or electromagnetic interference) is decreased. Ordering equal or similar components from different manufacturers can also have economic benefits, as the dependence on one manufacturer can be reduced. Moreover, for an incremental and test driven development of the power electronics converters and machines, real flight verifications and validations of new (e.g. more efficient, lighter, higher voltage) and possibly still error-prone designs are possible with low risk, if just one drivetrain group is used for the new design while reliable and tested older designs are used for the other drivetrain groups.

Assessment of Proposed Solution and Obtained Results

Generally, the solution approach can be seen as simple—once the correct fuse and shut-off control ratings are determined—in view of FIGS. 8a and 8b with the relatively high optimal number of electrical cables 32, 33 in the tether 30. That simplicity can be assessed as an advantage or even as ideal. Only the analysis of the faults, particularly the short circuit faults between two drivetrains, and the relative fuse ratings and thresholds for the converters' shut-off control can be tedious. Indeed, the derivation of the relative fuse ratings and the general control approach described in the section describing the fuse system and control approach was supported strongly by a large number of circuit simulations. Moreover, the choice of the exact thresholds can be tedious. Initially shorter fuse times and shut-off threshold times were chosen for a system implementation, which worked well in simulations but did not work in experiments. Therefore, Tref was increased from the initial value of 1 ms to 2 ms. Even this value was at the verge of achieving the acceptance criteria by viewing the relatively slow settling times of the measured currents. The main reason for the discrepancy of the simulated and the measured values were the poor estimations or disregard of the parasitics. Therefore, in an implementation for a real airborne system 100' or a real drag power kite plant, better models and measurements of the parasitics are beneficial, and particularly experimental verifications and validations of the choice of the thresholds are necessary.

A further advantage of the disclosed solution is that fuses 61, 62, 63 and the control of the kite 10' and ground station converters 58 are independent, i.e. no communication or a central microcontroller are required (which themselves can be faulty). Only to schedule a landing after a fault a communication to the flight controller is required. However, the same communication busses that are needed anyways to control the kite 10', namely the communication with the rotor drive power electronics onboard the kite 10', can be used for this task.

A grain of salt is the relatively high absolute maximum voltage in a wire $U_{w,abs-max}$ which occurs during some short circuit faults and requires a relatively thick insulation. However, this is independent of the fault mitigation concept. Moreover, $U_{w,abs-max}$ exceeds twice the rated voltage only in the short circuit faults S21-S22, and, by investigating the actual voltages of a circuit simulation, only for a very short time, until the capacitors are discharged during the short circuits. If parasitic capacitances would be considered, the over-voltage could be smaller. Additionally, S21-S22 are faults which can be made very unlikely or even close to impossible with a reasonable ground station design and routing of the electrical cables. Therefore, in a real system implementation, $U_{w,abs-max-allowed}$ could be reducible. The disclosed solution was verified successfully by simulations and measurements. Hence, the present invention provides a viable solution, maybe only with small refinements and more detailed analyses for the selection of the exact fuse ratings and control thresholds for a particular system implementation.

Fault Tolerant Onboard Low-Voltage Bus

Besides the rotors 14, also the sensors, control electronics, control surfaces and communication systems need power from a low-voltage source. That power is much smaller than the rated power of a single rotor drivetrain. Therefore, the use of low-voltage busses onboard the kite supplied by DC-DC power electronic converters seems most practical. For a high fault tolerance without single point of failure through redundancies, there should be at least two low-voltage busses. Each rotor drivetrain group could contain a DC-DC converter to supply its drive control electronics, and to supply a low-voltage bus, which might or might not be isolated from the other rotor drivetrain group's low-voltage busses. Moreover, separate DC-DC converters just to supply a low-voltage bus can be used.

To reduce or even eliminate the probability, that a high voltage of a drivetrain is shorted to the low-voltage bus with the possible consequence that all connected loads are destroyed, a number of mitigations can be sketched:

(i) Isolated DC-DC converters should be used, most practically through a medium-frequency transformer. Note however, a transformer and thus an isolation is likely required anyways, because the high-voltage to low-voltage ratio is rather high. With well manufacturing and considerable safety factors, a high-voltage to low-voltage bus short circuit fault is already unlikely.

(ii) If each DC-DC converter consists of two consecutive isolated stages (i.e. conversion from high-voltage to medium-voltage to low-voltage), if the windings of the transformers of both stages are insulated for the high voltage and with an appropriate routing, then a short circuit fault down to the low-voltage bus can become close to impossible. Note that such a multistage approach might also be beneficial, because of the rather high voltage ratio.

(iii) Fuses and other circuit protection components such as gas discharge tubes can be used to protect all onboard loads from a high voltage.

(iv) If each rotor drivetrain group has a DC-DC converter (possibly with several stages) and each DC-DC converter supplies only a small number of loads (e.g. a small number of control surfaces), which in a fault case, are not necessary for a safe landing, then there is also no single point of failure. Additionally, with optical communication busses, the "isolated drivetrain groups" can stay fully isolated on every single voltage- and power-level.

Finally, also a combination of these approaches is possible. Moreover, (relatively small) onboard batteries just for the low-voltage onboard loads (not for the rotors) can help to increase the fault tolerance or achieve a system without single point of failure.

Kite without any Single Point of Failure

In this study, a power electronic system design approach of a drag power kite without single point of failure is proposed. Although the rotors ("power plant" in avionics terminology) are very important for the system, also other parts must function in order to enable a safe landing at any time. Therefore, it is worth to investigate, if other parts can also be designed such that a drag power kite plant design can be obtained without any single point of failure and thus with a high fault tolerance and only with a negligibly low remaining risk of a crash. For that, the following approaches can be sketched:

(i) The tether core and the mechanical tether core connections on ground and at the kite should be redundant. E.g. two core ropes could be used, where one alone could also hold the kite (with a safety factor>1). As a rope consists of a high number of strains, a tether core redundancy might be also achievable with a single rope with a reasonable safety factor and redundant tether connections on the ground and at the kite.

(ii) To limit the load in the tether and in the airframe, active or/and passive strategies should be utilized: E.g. strain gauges on the kite measure the load and when a threshold is exceeded the lift coefficient is reduced (e.g. all flaps are retracted or the angle of attack is reduced). The airframe could also be designed to deform at a certain load threshold, such that the lift coefficient is reduced (e.g. by stalling or angle of attack reduction) and the load is always limited passively.

(iii) To cover sensor failures, each important value for the flight control should be sensed redundantly either through redundant sensors or an observer approach.

(iv) The control computers, control software and the communication system should be redundant, e.g. similar to Boeing's and Airbus's redundant fly-by-wire design.

(v) Besides the redundant rotors, also the other actuators should be redundant, both on the ground station and onboard the kite. E.g. the control surfaces for flaperons, rudders and elevators should be redundant.

(vi) To ensure integrity of the airframe without single point of failure, redundancies should also be used, e.g. redundant screws.

(vii) To prevent, extinguish and/or isolate a fire e.g. in a power electronics component, appropriate measures should be taken. In the ground station, a fire should be extinguishable with conventional measures as there are no weight or volume restrictions. Onboard the kite, a fire isolation might be an option with appropriate fire-proof walls, such that a fire does not spread. With a fire extinguishing system with low weight and volume, e.g. based on $CO_2$, it might be also possible to extinguish fires onboard the kite. Another possibility might be to keep the inside of the kite free of oxygen and instead fill it with an inert gas such as nitrogen.

Concluding, it is possible to design and build a drag power kite plant, without any single point of failure, i.e. any fault in any component does not lead to a system failure (a crash).

Extreme Cases: Tether Tear, Lightning Strike, Mid-Air Collision, Sabotage/Terrorist Attack A system without single point of failure might be not tolerant against extreme cases or might still have a too high (or hard to quantify) remaining risk, particularly in an early development stage. Therefore, it is also interesting to further mitigate the probability of a crash:

(i) A (ballistic) parachute could also be installed onboard the kite. A drawback is the additional weight of the parachute (and additional development and validation), and particularly that the possibly several tons heavy kite lands uncontrolled and still with a not negligible speed on the ground (for reasonable parachute sizes about three meters per second). The kite cannot be relaunched automatically. Instead, a team of technicians, possibly a crane and repairs are required before the kite can operate again. Therefore, in a kite power plant product, a parachute can only be considered as last resort to avoid the worst. However, a parachute can also prevent a crash in case of a tether tear, if parts of the airframe tear, or if several systems fail simultaneously, caused e.g. by a lightning strike or sabotage/terrorist attack (e.g. hacker attack). Therefore, the parachute electronics might also be supplied by an emergency battery and be independent of the other system parts.

(ii) In case of a tether tear, one could also think about a horizontal landing, similar to a usual airplane. However, several measures are required for that: The kite needs (small) onboard batteries to supply the control electronics and the control surface actuators (note that batteries to supply the rotors for a multicopter-like landing is not an option, because batteries would be way too heavy, as mentioned in the motivating section), landing gears are required, a landing strip is required, and the control system has to be extended to land the kite in this way autonomously. Therefore, a horizontal emergency landing approach might be evaluated as a too high development and validation effort.

(iii) To prevent lightning strikes, a landing at the right time seems most practical. To determine "the right time", not only weather forecasts should be used, but particularly the atmospheric electric field should be measured on the kite and/or at several points close to the kite power plant installation site, e.g. with field mills on the ground similar to NASA's rocket launch pads.

As soon as a threshold of the atmospheric electric field is exceeded, a landing is scheduled. The ground station then only needs usual lightning arresters as used for buildings.

(iv) It might be also possible to design the system to withstand a lightning strike. The lightning current is either conducted to earth via a conductive tether core (e.g. steel or maybe in future available carbon nanotubes), whereby the core might need a surrounding high-voltage insulation layer, which could however also serve as strain relief layer or via the positive and negative cables, if the power electronics on ground and on the kite is protected accordingly, if the wire area is large enough and if the insulation can withstand the lightning voltage. With a DC transmission in the tether, a lightning voltage protection e.g. based on gas discharge tubes could be used as a possibility to protect the power electronics. With an AC transmission in the tether, the transformers could already protect the power electronics from the lightning voltage, if the materials are selected to allow for a lightning-hardened design.

(v) To prevent a mid-air collision of the kite with an airplane, the ground station must be placed far enough away from airports. Moreover, the operation volume of a kite should be a no-fly zone. This is similar to conventional wind turbines or to nuclear power plants. Note, that it is meaningful that the tether is relatively short (a few hundred meters) to limit the tether's drag. Therefore, the flight altitude of a power generating kite is likely below 1000 m, likely even below 500 m. Therefore, the no-fly zone would not be unreasonably large. To further reduce the risk of a mid-air collision, a radar could be used to schedule a landing or low-altitude hovering, if an airplane comes too close. Additionally, the kite or the ground station could emit a warning signal or could operate a traffic collision avoidance system (TCAS).

Further Applications of the Proposed Solution

The proposed solution of isolated drivetrain groups can also be used in other airborne wind energy concepts e.g. aerostats, lift power kites (i.e. kite power systems where the generator is on ground, coupled to a winch, and power is generated in a pumping process, or kite power systems pulling a load on ground such as a ship) with rotors for multicopter launch and landing or for climbing after other means than vertical launch or wind power extraction with rotors, undersea kites with rotors, or even general electric aircraft.

If no permanent power exchange with the ground is required or considered, an isolated drivetrain group is just onboard, i.e., referring e.g. to FIG. 11, the "tether" 30 and (in part) the "ground station" 50 are just electrical cabling and components onboard the vehicle. There may be no grid connection 70, and possibly no "power electronic converter(s) ground (C)" 58-3 and/or possibly no "power electronic converter(s) ground (B)" 58-1, and/or no paralleling of the power flow left to the UPS's 59. Accordingly, e.g. the equivalent circuit diagram in FIG. 9 may need to be changed. However, some of those previously mentioned converters and the paralleling of the power flow (parallel connection left to the UPS's) onboard the vehicle may be used, as it may be useful to balance the energies of the individual energy storages of the UPS's 59. Moreover, "power electronic converter(s) ground (C)" 58-3 and the grid connection 70 may be existent temporarily in part in a ground unit to recharge the energy storages of the UPS's 59.

Conclusions and Recommendations

An approach to a fault tolerant power electronics system design for a drag power kite is presented. The key idea originated from the tether cross section design, in which a high number of electrical cables is optimal for a small diameter. Instead of connecting all positive (negative) cables in parallel on the kite and on the ground, they are left isolated (at least in part) and connect to only one drivetrain group consisting e.g. of a single onboard drivetrain, or consisting of the onboard drivetrains of two point-symmetric rotors. On the ground, the cables of one drivetrain group are connected to a UPS before the power flow is paralleled. A fuse system and a shut-off control of the power electronic converters were derived, but in detail a number of power electronic topologies for the converters and either DC or AC transmission in the tether are possible. With the generalization also a number of variants for subsystems are sketched. Moreover, further measures to design a complete kite power plant without any single point of failure, further fault tolerance enhancements, and further applications of the proposed solution are discussed.

To implement the proposed fault tolerant power electronic system design approach for a drag power kite plant realization, or generally for an airborne system realization, the following recommendations can be made: A circuit simulation model with an equivalent circuit of the chosen topology, tether transmission type (DC or AC), and with parasitics (measured or estimated) should be set up and all thinkable faults (at least all representative ones) at different locations (e.g. very close to the ground, middle of tether, very close to the kite), in different variants of motor and generator mode (set currents for drivetrains (a) and (b) e.g. $I_r$, $I_r/2$, 0, $-I_r/2$, $-I_r$) should be simulated. As a high number of cases must be investigated, the simulation executions and checks against requirements should be automated. If a case results in unacceptable states, it should be investigated in detail by viewing the voltages, currents and states of fuses and controls, and the fuse ratings, control ratings and/or component design ratings should be altered accordingly. When all simulations fulfill all requirements, all fault cases should also be verified experimentally. Also here an automatization (at least partly) is beneficial due to the high number of possible faults. Moreover automatized experimental tests can serve to validate a plant either in an end-of-production-line-test or before first operation on site. Additionally, a full failure modes and effects analysis (FMEA) should be performed as for a usual product development.

Further Details about Some Representative Faults

Detailed investigations of circuit simulations of some representative faults are discussed in the following.

Short Circuit Fault S2 in Motor Mode

The short circuit fault S2 can be estimated to have a high probability among the short circuit faults. Moreover, important ideas of the present invention become clear, by a detailed investigation.

Therefore, FIG. 13 elucidates the investigation of short circuit fault S2: (a) short circuit currents driven by UPS(s) over different paths 41, 42 and (b) circuit after fuse opened.

In other words, FIG. 13*a* visualizes the short circuit fault S2 and the short circuit currents, which are driven by the positive UPS of drivetrain 17*a*, (a). As the current path 41 leads through fuse F3*a*, it opens and stops the short circuit current. As visualized in FIG. 13*b*, the positive wire and a shield of drivetrain 17*a*, (a) are then connected while there is an open circuit in fuse F3*a*. In motor mode, the voltage at the drive therefore decreases to the voltage of the negative ground converter 58 (or UPS 59) which is half of the rated voltage. As the kite converter 18 has an under-voltage turn-off threshold e.g. at 70% of the rated voltage, it turns off after the turn-off threshold time is exceeded. Moreover, as the positive wire has the same potential as the shield, the voltages at the kite converter 18 are unbalanced, which is why it also goes into an unbalance state.

Figure 14:
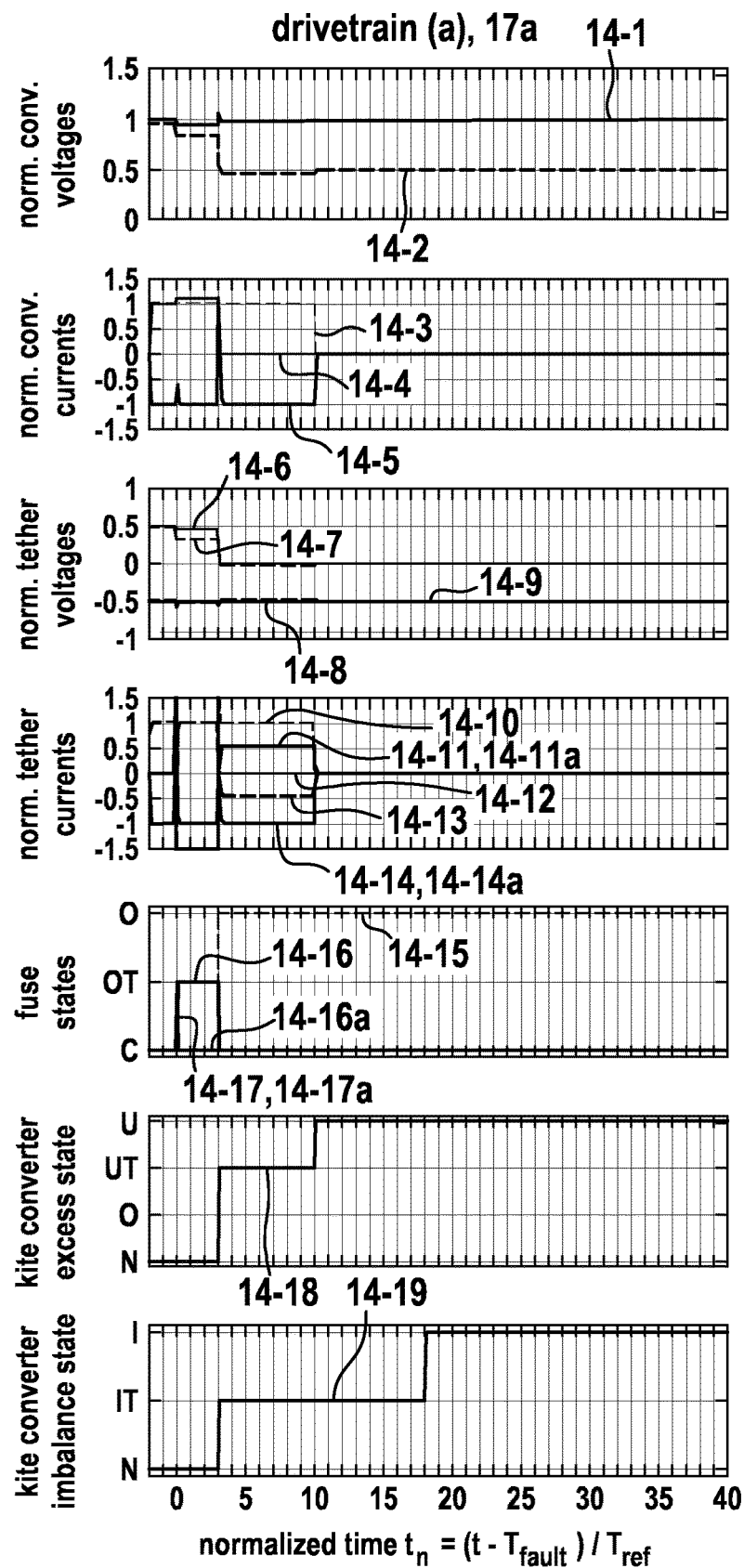
Figure 14:
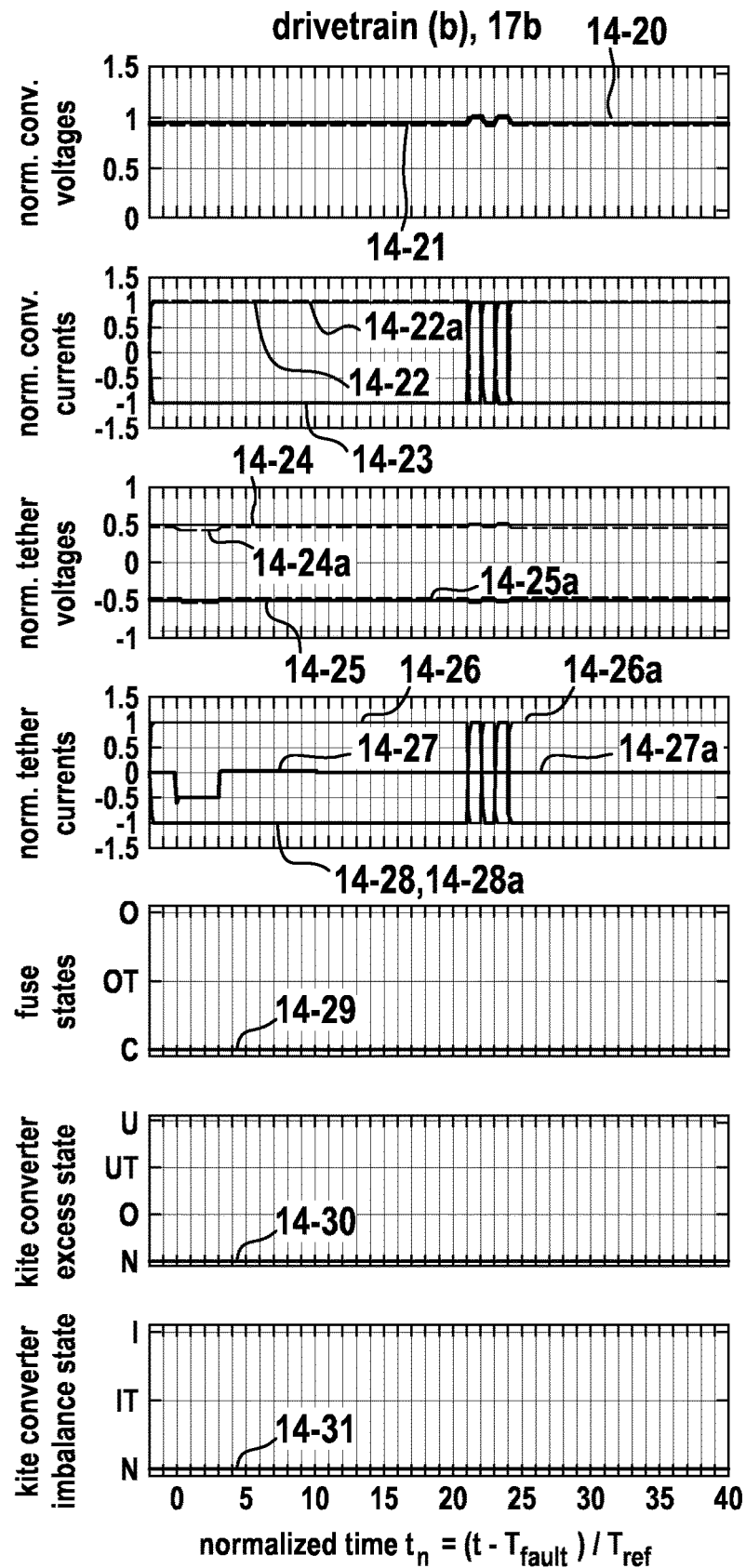

FIG. 14 reports the circuit simulation results. The fault occurs at tn=0. The currents in the positive wire of drivetrain (a) are high and driven by the positive UPS voltage source of drivetrain 17*a*, (a). At tn=3, fuse F3*a* opens as expected and stops the short circuit current. The voltage at the kite converter 18 drops below half of the voltage. The under-voltage and the voltage imbalance thresholds are exceeded which is why the kite converter goes into the under-voltage triggered and imbalance voltage triggered states. The drive still works in motor mode, supplied by the negative ground converter. At tn=9, the under-voltage time threshold is exceeded and the converter is turned off. At tn=16 also the imbalance time threshold is exceeded, though the converter was already turned off. At tn=20, the set currents of both drives are stepped up and down a few times to investigate the behavior after the fault mitigations, but no further faults occur. Ultimately, drivetrain 17*a*, (a) becomes unavailable in motor mode but drivetrain 17*b*, (b) is still available in both modes. Obviously, all acceptance criteria are fulfilled.

In other words, in FIG. 14 simulated voltages, currents and states for short circuit fault S2 in motor mode are shown:

row 1: ground converter total voltage in traces 14-1, 14-20, kite converter total voltage in traces 14-2, 14-21;

row 2: current of positive (traces 14-4, 14-22) and negative ground converter (traces 14-5, 14-23), current of kite converter 18 (traces 14-3, 14-22*a*);

row 3: voltage of positive (traces 14-6, 14-24) and negative (traces 14-9, 14-25) tether wire 32, 33 at ground 50 in solid lines and voltage of positive (traces 14-7, 14-24*a*) and negative (traces 14-8, 14-25*a*) tether wires 32, 33 at kite 10' in dashed lines;

row 4: current in positive (traces 14-12, 14-26) and negative (traces 14-14, 14-28) tether wire 32, 33 and in shield at ground (traces 14-11, 14-27) in solid lines and current in positive (traces 14-10, 14-26*a*) and negative (traces 14-14*a*, 14-28*a*) tether wire 32, 33 and in shield (traces 14-14*a*, 14-27*a*) at kite 10' in dashed lines;

row 5: state of fuse F1 #, F2 # (trace 14-17), F3 # (trace 14-15), F4 # (trace 14-17*a*), F5 # (trace 14-16) and F6 # (trace 14-16*a*) with C for conducting, OT for conducting but over-current triggered, and O for open or over-current;

row 6: kite converter voltage excess state with N for normal, O for over-voltage, UT for under-voltage triggered and U for under-voltage; and row 7: kite converter voltage imbalance state with N for normal, IT for imbalance triggered and I for imbalance.

All voltages are normalized for the rated voltage, all currents are normalized for the rated current of a drivetrain group 16 and the time is normalized tn for the reference time Tref and shifted to the fault time Tfault. All voltages are given with respect to the nearest shield and the sign of all currents are counted from left to right in FIG. 9.

Short Circuit Fault S2 in Generator Mode

Figure 15:
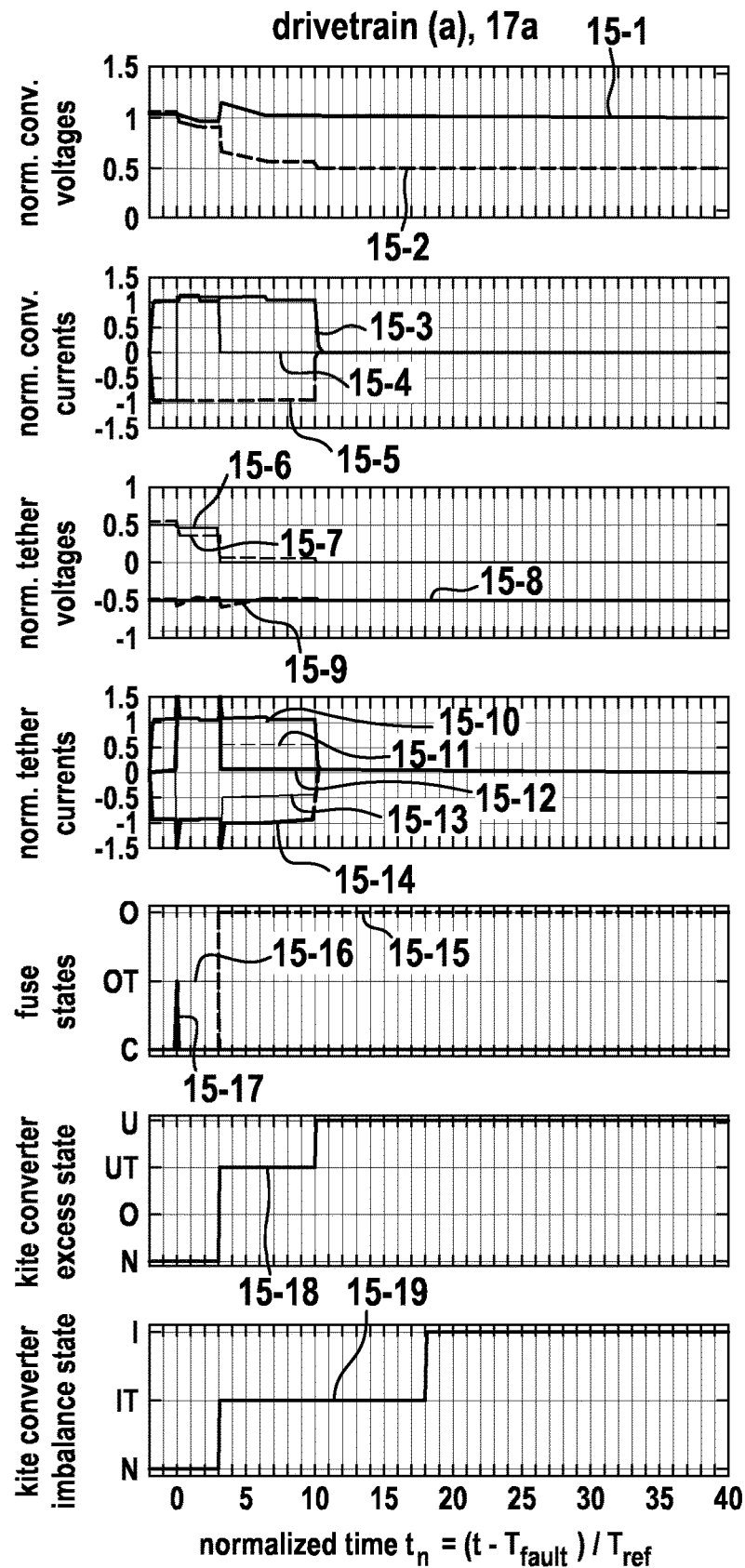
Figure 15:
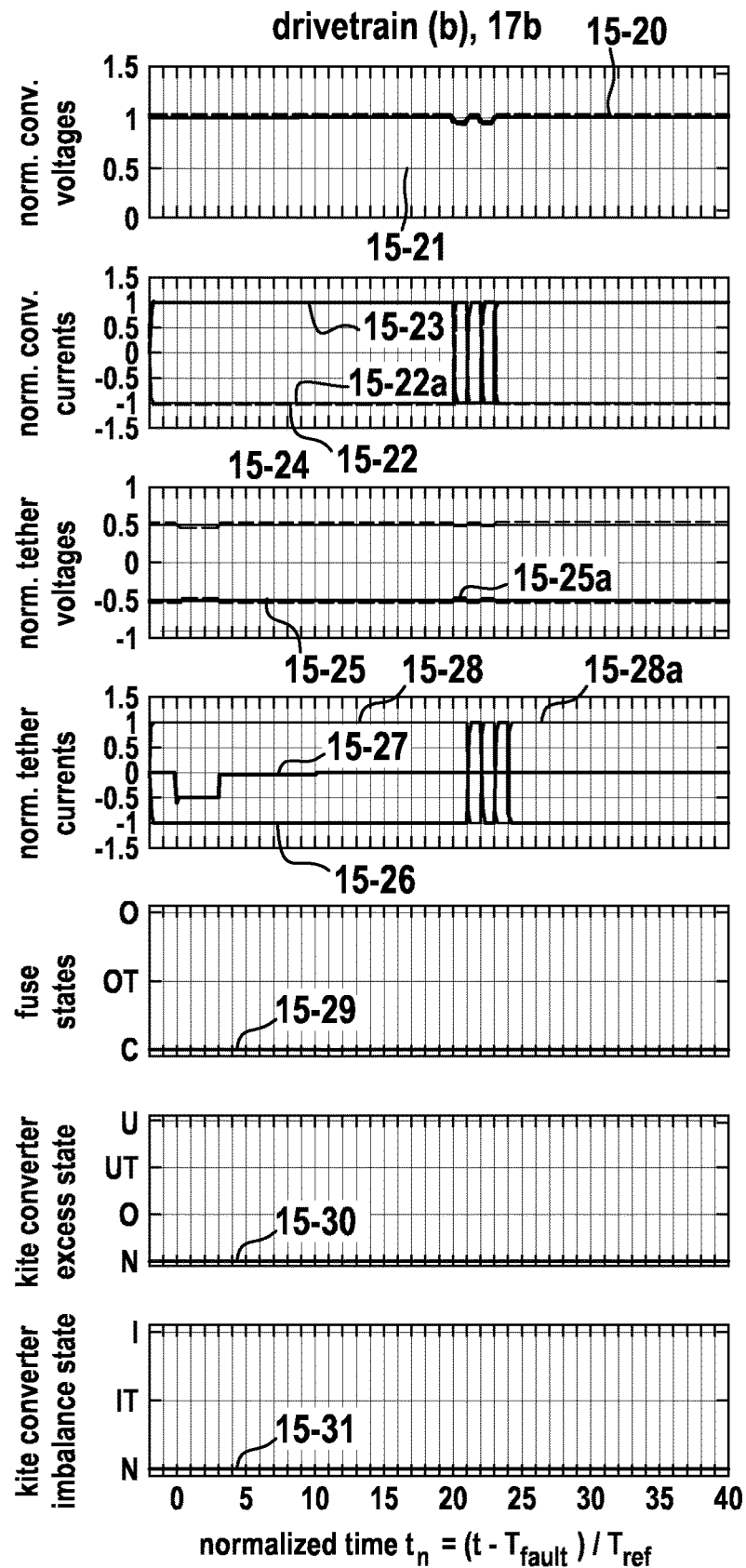
Figure 16:
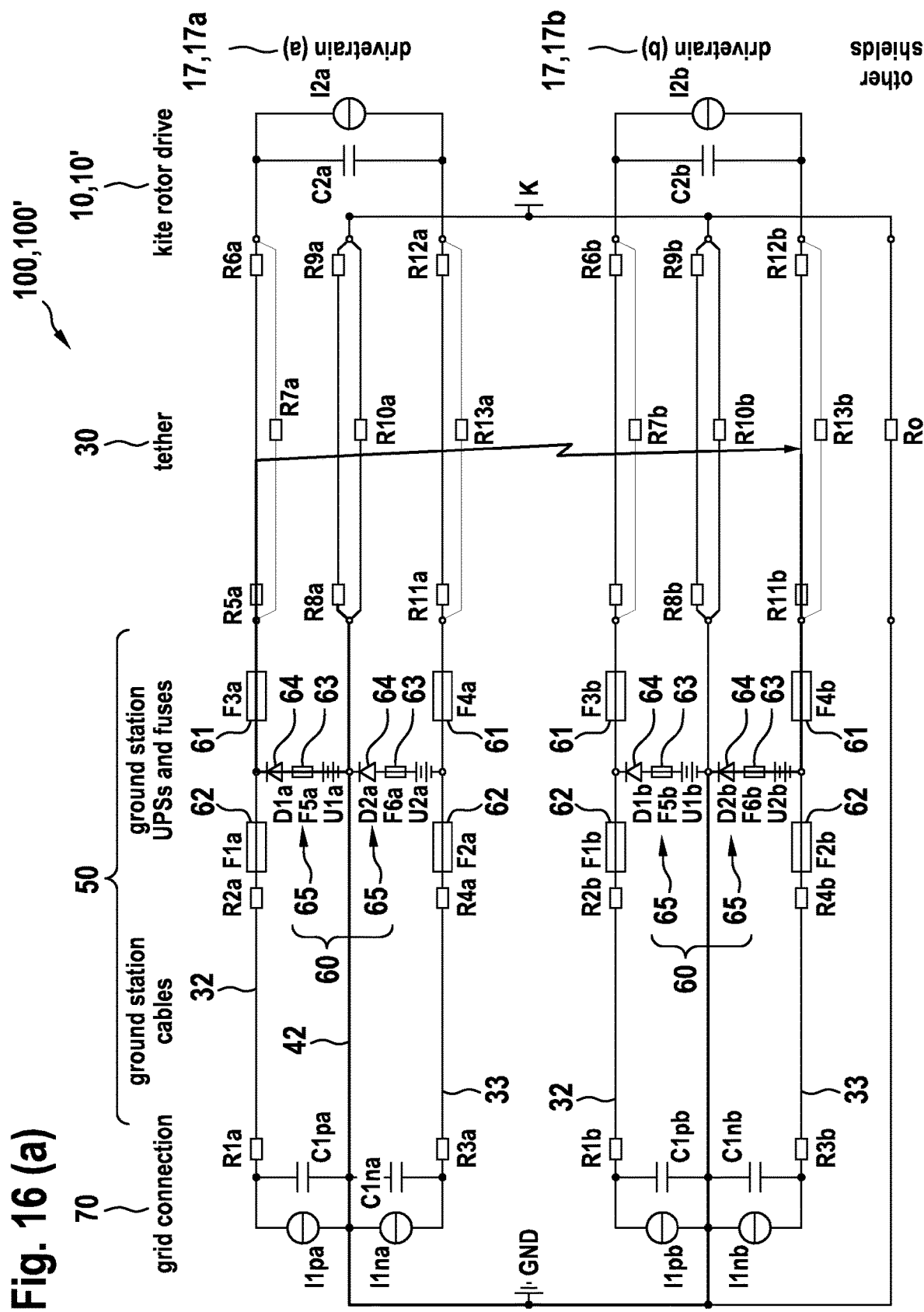
Figure 16:
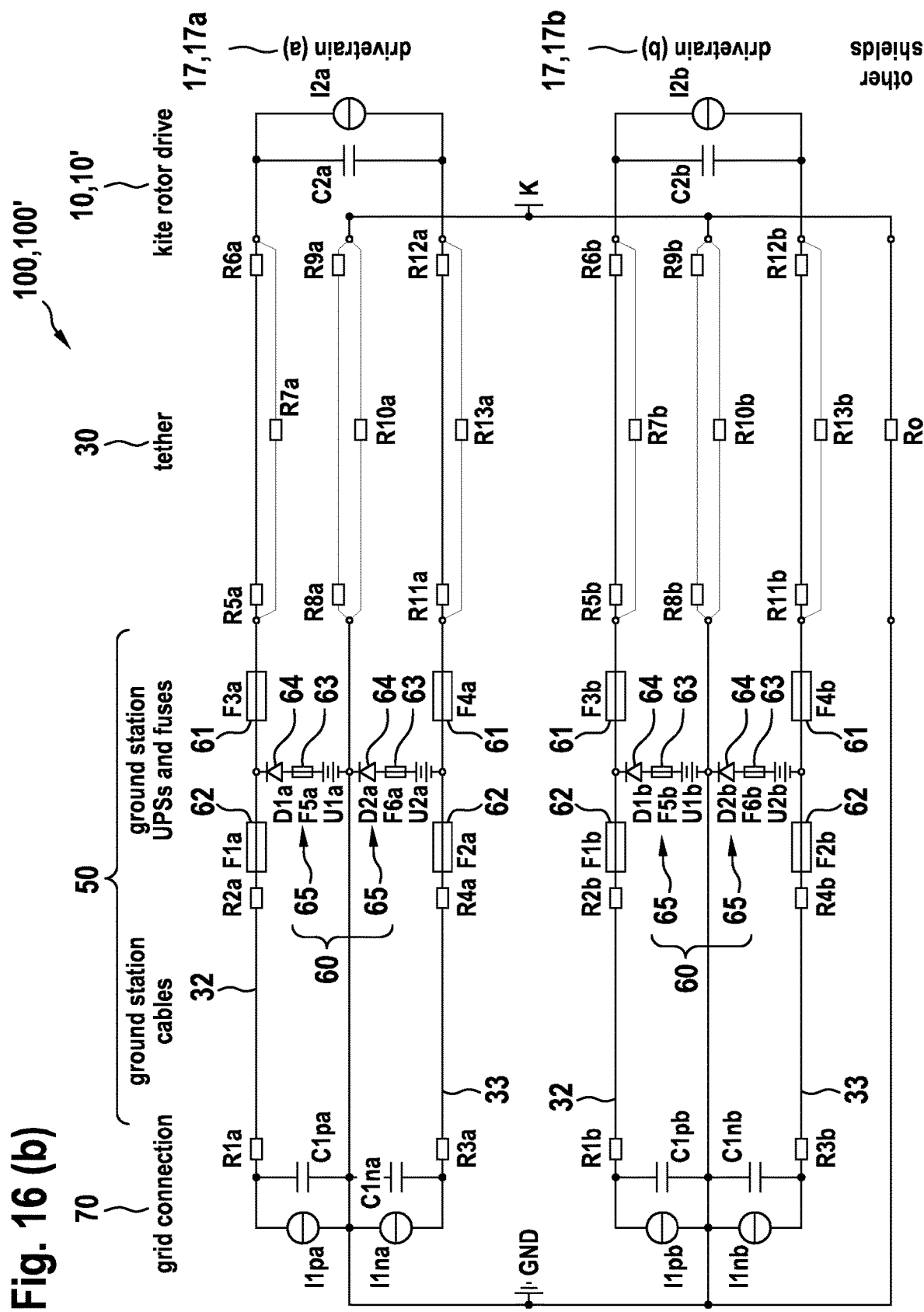

By investigating short circuit fault S2 for the case where both drivetrains are in generator mode also helps to make important concepts of the proposed approach clear, FIG. 13 reports the simulation results. The most important difference to FIG. 14 is that the voltage at the kite converter of drivetrain (a) does not drop as much, after the fuse opens at tn=3. With the considered parameters, it is below the 70% rated voltage threshold such that the kite converter goes into the under-voltage triggered state. However, with other parasitic resistances, another rated current or other thresholds, this might be not the case, but as also the imbalance threshold is exceeded, the converter will be shut off soon or later. In FIG. 15, it is already shut off at tn=9 with the under-voltage state. If no under-voltage had been triggered, it would have been shut off at tn=16, where also the imbalance time threshold is exceeded. Again, ultimately, drivetrain (a) becomes unavailable, but drivetrain (b) is still available in both modes, and all acceptance criteria are fulfilled.

Short Circuit Fault S7 in Motor Mode

The previously investigated fault S2 affects virtually only one drivetrain (though, the short circuit current also does flow through the other drivetrains' shields which has effects on the tether voltages and currents, cf. FIGS. 14 and 15). However, an important feature of the proposed fault tolerance concept is that only one drivetrain becomes unavailable, even if there is a short circuit between two drivetrains. FIG. 16*a* draws the short circuit current during fault S7, which is driven by the positive UPS of drivetrain (a) and the negative UPS of drivetrain (b). The current path leads through fuse F3*a* and F4*b*, but fuse F3 # opens faster than fuse F4 #. Therefore, the short circuit current is stopped when F3*a* opens. As visualized in FIG. 16*b*, the positive wire of drivetrain (a) and negative wire of drivetrain (b) are then connected, while there is an open circuit in fuse F3*a*. If drivetrain (a) is in motor mode, its voltage therefore decreases until it is shut off.

Figure 17:
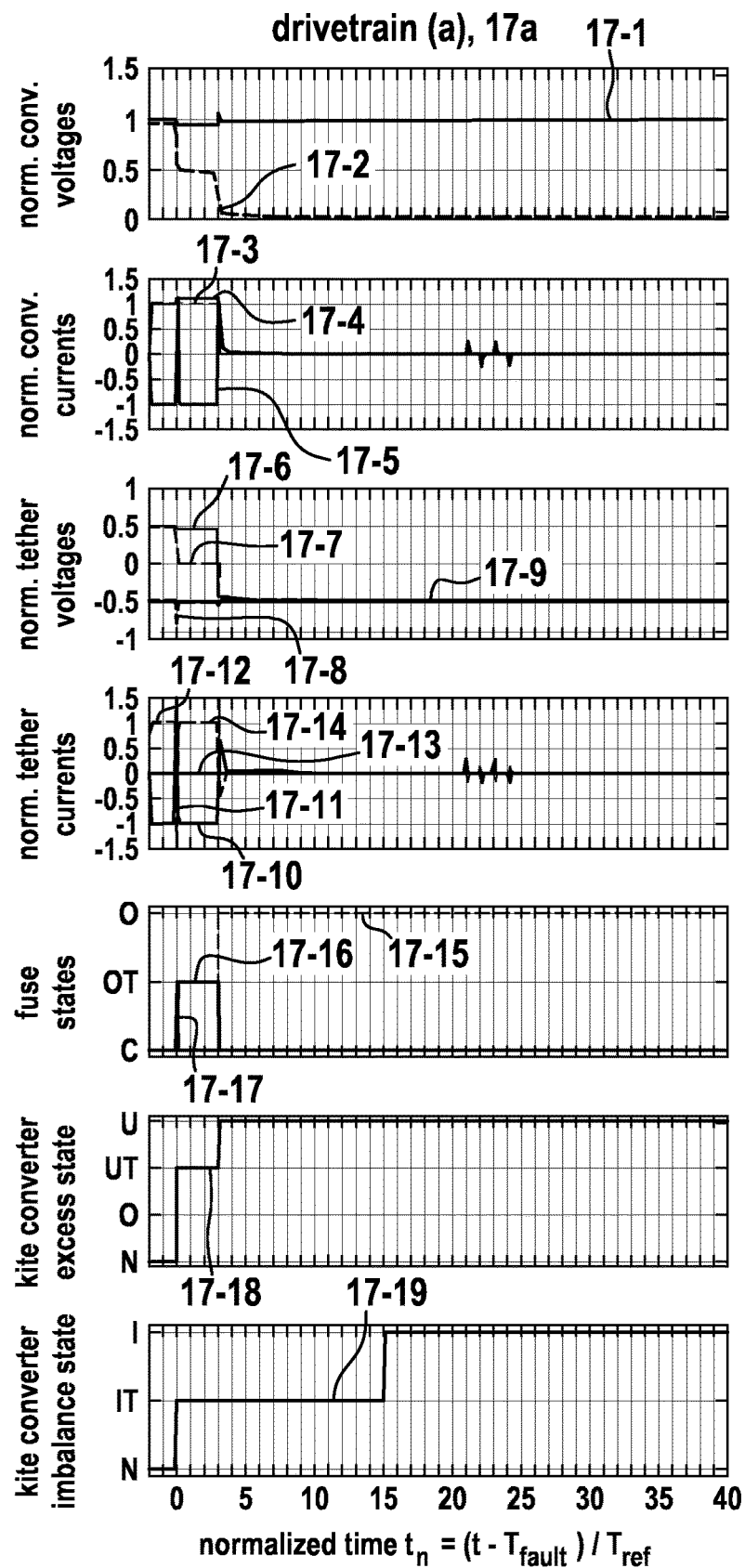
Figure 17:
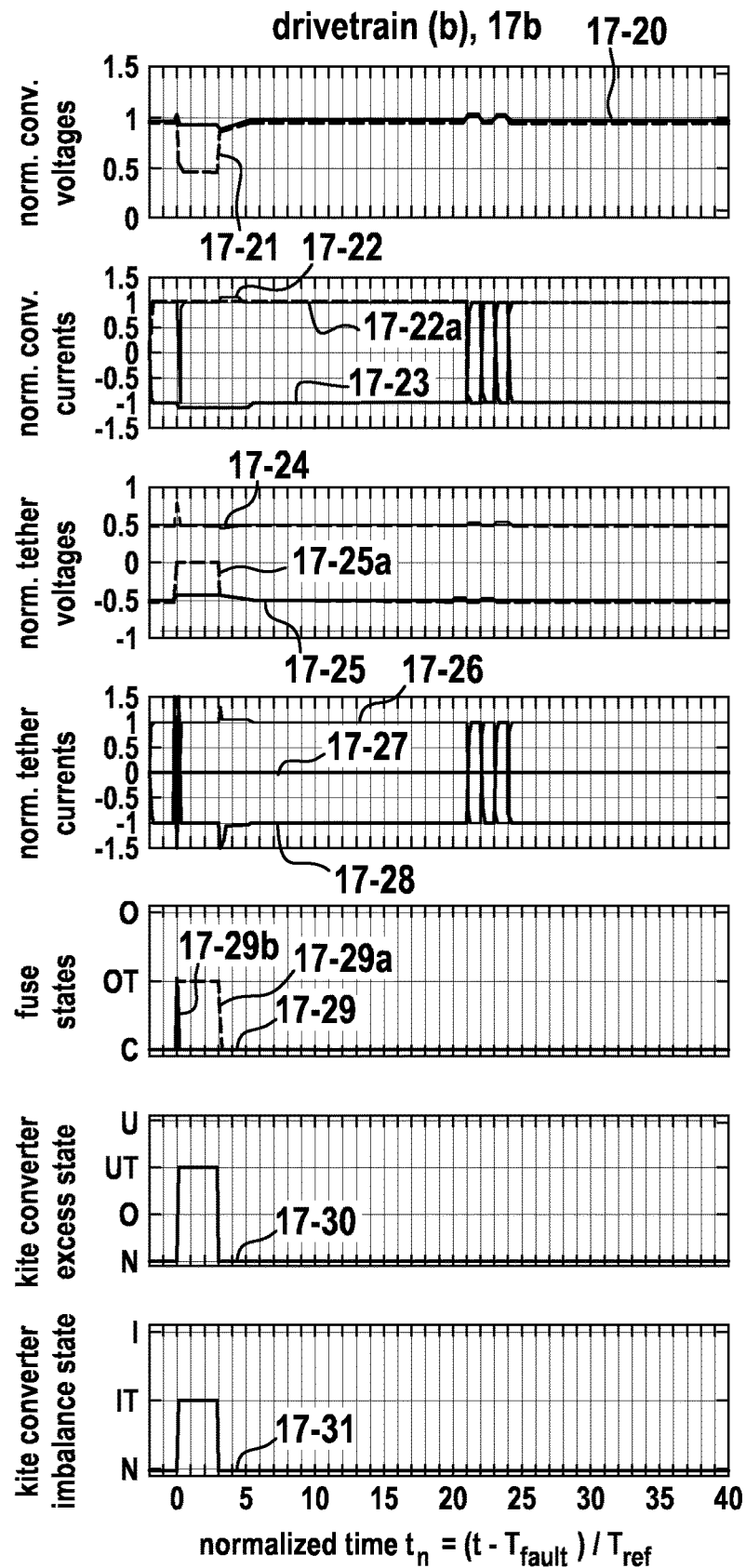
Figure 18:
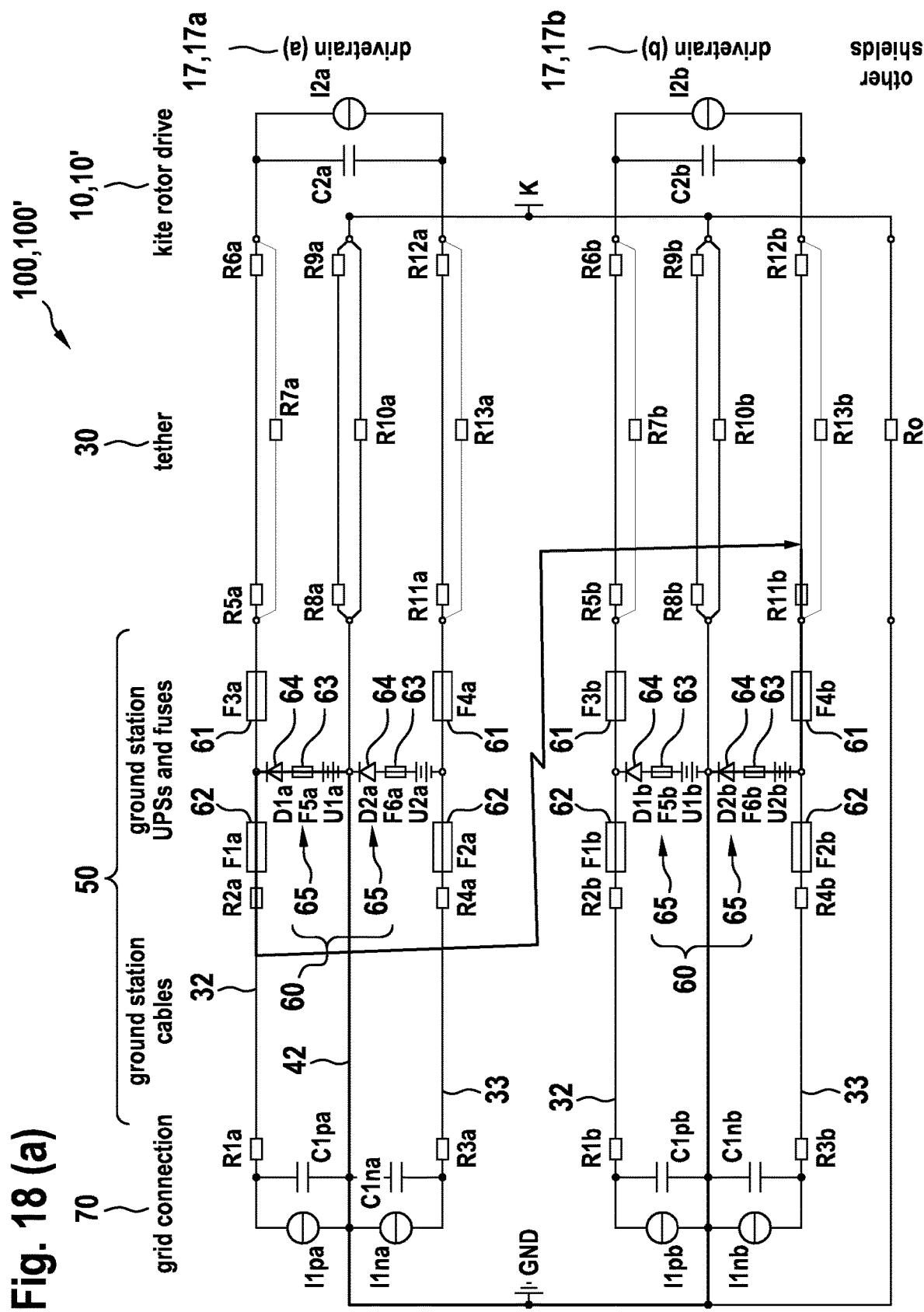
Figure 18:
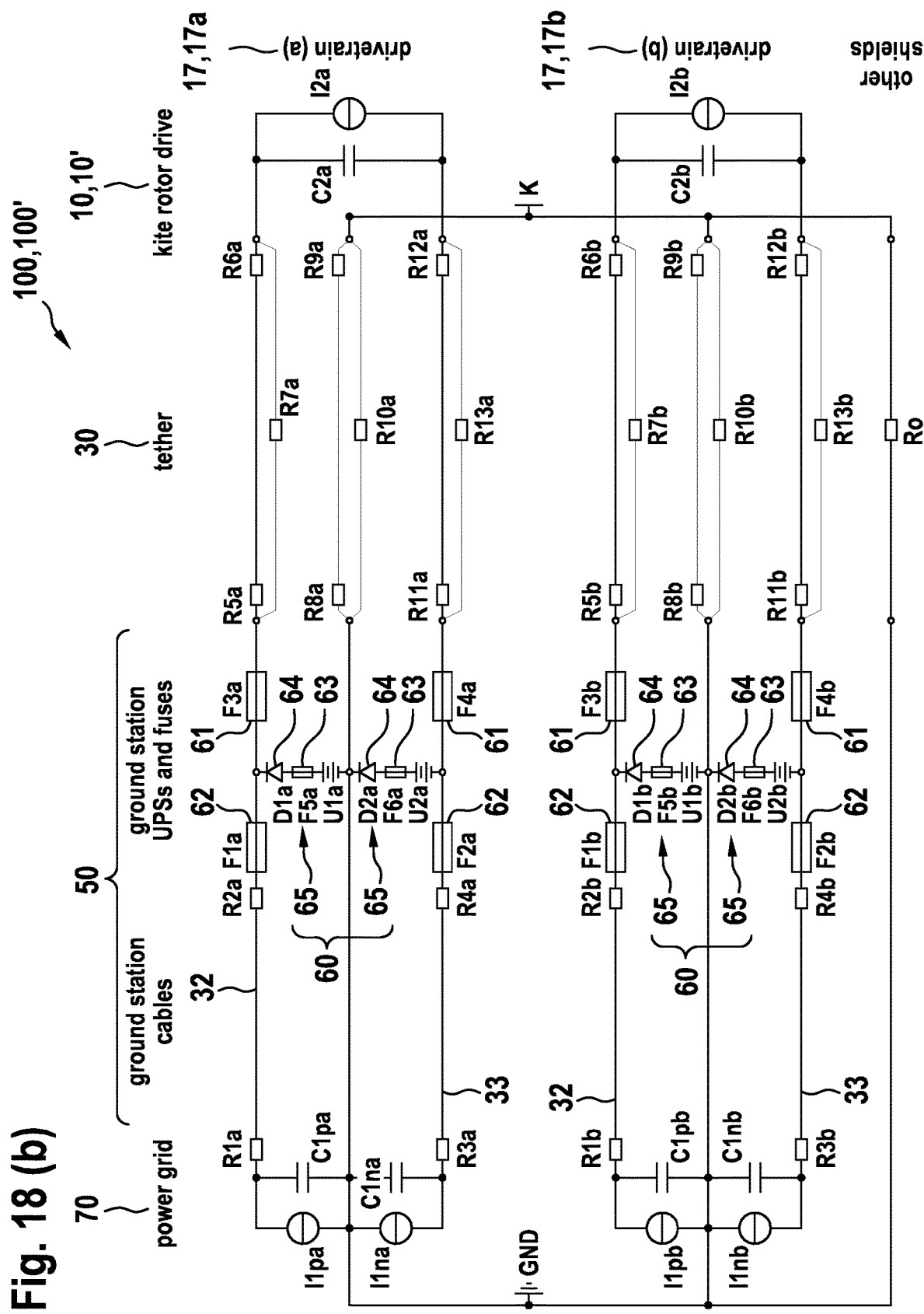

FIG. 17 reports the simulation results. At tn=0, the currents on the ground in the positive tether wire of drivetrain (a) and in the negative tether wire of drivetrain (b) are very high. The voltage of both drives drops to half of the rated voltage. Fuse F3*a* stops the short circuit current at tn=3. As drivetrain (a) is still in motor mode, its voltage drops almost to zero, which is why it is shut off before the low-voltage time threshold is reached. On the other hand, the voltage of drivetrain (b) goes back to the rated voltage and it continues operation normally. Therefore, all acceptance criteria are fulfilled.

It should be noted, that the differences of S7 in generator mode (not shown here) to the motor mode are similar to the differences between S2 in motor and generator mode.

Short Circuit Fault S21 in Motor Mode

It is also worth investigating one of the most complex short circuit faults, S21, in detail. In particular, FIG. 18*a* draws the short circuit current, which is driven by the positive UPS of drivetrain (a) and the negative UPS of drivetrain (b). The current path leads through fuse F1*a* and F4*b*, but fuse F1 # opens faster than fuse F4 #. Therefore, the short circuit current is stopped when F1*a* opens.

As visualized in FIG. 18*b*, the positive ground wire of drivetrain (a) and negative tether wire of drivetrain (b) are then connected, while there is an open circuit in fuse F1*a*. Therefore, the positive ground converter continues to drive a short circuit current. However, it cannot build up a voltage and therefore it will soon go into an under-voltage state and shuts off. Drivetrain (b) continues to work normally, and drivetrain (a) is still available in motor mode, supplied by its UPSs.

Figure 19:
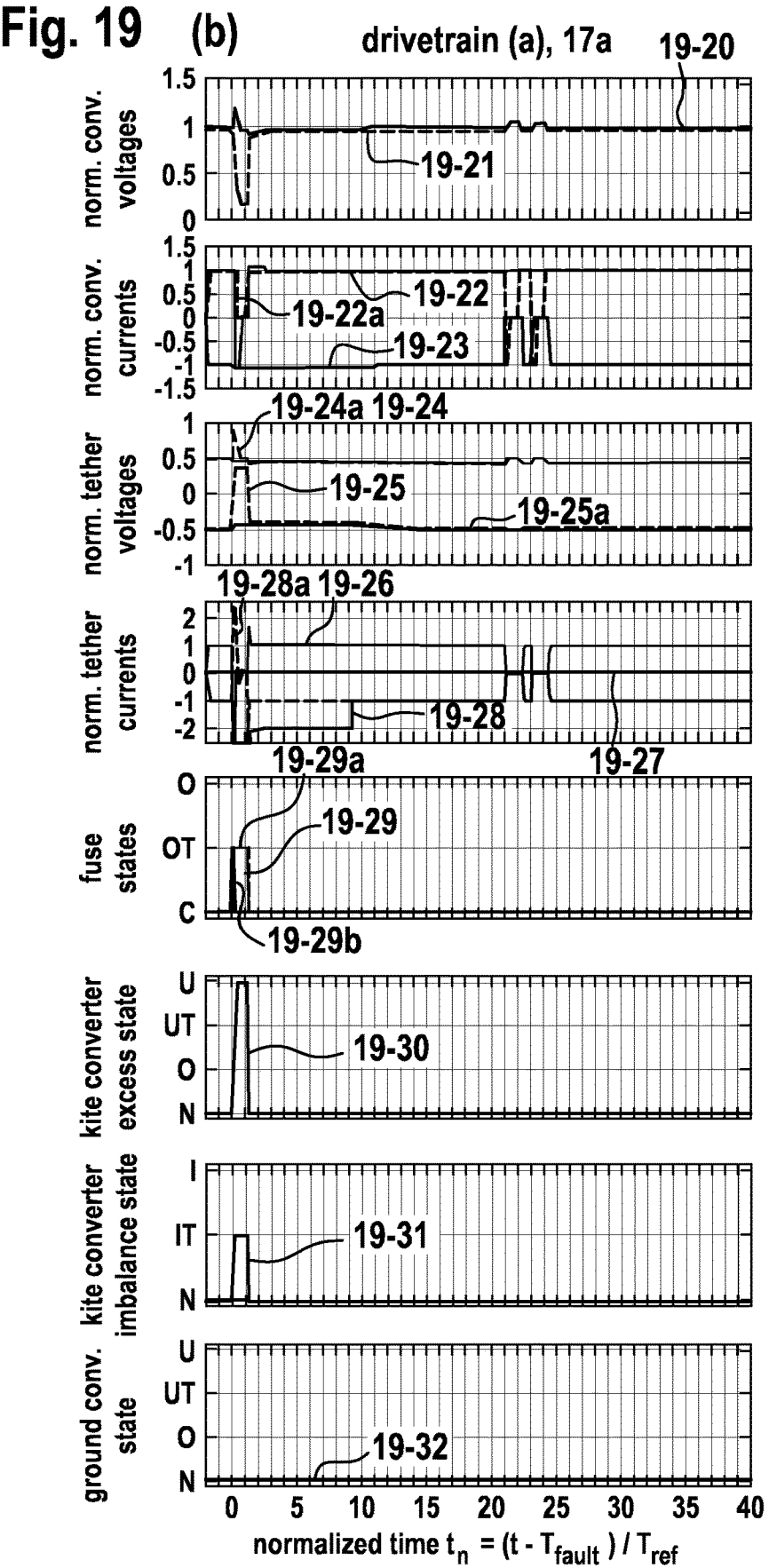

Further, FIG. 19 reports the simulation results. At tn=0, when the short circuit current occurs, the kite converter voltage of drivetrain (b) drops almost to zero which forces the converter into the under-voltage state. As the fuse F1*a* opens at tn=1, the short circuit current driven by the UPSs is stopped and the voltage at the kite converter of drivetrain (b) regains the rated value which brings it back into the normal state. However, the positive ground converter continues to drive a short circuit current, which is why at the negative tether wire of drivetrain (b) on the ground conducts twice the rated current. Though, as the voltage at the positive grid converter is almost zero, it already went into the under-voltage trigger state. At tn=8, the under-voltage time threshold is reached which brings it into the under-voltage state and shuts off the positive ground converter of drivetrain (a). Nevertheless, drivetrain (a) stays available at all times, but its UPSs step in at tn=0. Moreover, drivetrain (b) is only unavailable from tn=0 to tn=1. Therefore, all acceptance criteria are fulfilled.

When the set currents of the drivetrains step around tn=20, it should be noted, that drivetrain (a) cannot stay in generator mode as there is no power sink. Therefore, the voltage exceeds the over-voltage threshold at tn=21 and tn=23. As the negative potential is coupled with its negative ground converter, the negative voltage does not change, instead only the positive voltage changes up to the threshold. Accordingly, the positive potential increases more than in a faultless case. Moreover, the potential in the positive tether wire of drivetrain (b) exceeds slightly more than twice the rated voltage, but only for a very short time in the event of the fault occurrence at tn=0.

It should be further noted, that the main difference of S21 in generator mode (not shown here) to the motor mode is that drivetrain (b) stays available at all times.

An actual rotor speed controller may demand a constant power, instead of a constant DC current as in the simulation. Here, three further requirements for the power electronics system hardware and software design become important:

First, the kite converter 18 should continue to work also with only half of the rated voltage at least for some time. However, this does not seem to be an important issue, neither if DC-DC converters nor if AC-DC machine converters are used as converters 18 closest to the tether terminals onboard the kite. For the latter, the machine's nominal voltage must be small enough which is mainly a question of the winding design and winding connection.

Second, the converters 18 should be able to supply the full rated power also at half the rated voltage and thus with twice the rated current at least for some time, which does neither seem to be an important issue, as this is like a temporary over-loading for a few milliseconds.

Third, for this case, the fuse trigger current must be at least twice the rated current plus safety margin, which is, however, again a modest design constraint.

Other Faults

All other faults drawn in FIG. 9 were also investigated in detail in simulation and partly automatized. Many faults were also investigated experimentally. For all cases, all acceptance criteria were fulfilled.

In addition to the foregoing description of the present invention, for an additional disclosure explicit reference is taken to graphic representation of FIGS. 1 to 19.

LIST OF REFERENCE SIGNS

10 airborne unit
10' aerial vehicle, kite
11-1 wing element, wing
11-2 wing element, wing
11-3 wing element, wing
12 motor/generator unit, motor/generator
13 frame
13' center of mass
14 rotor
16 group of motor/generator units
17 drivetrain
17a drivetrain
17b drivetrain
. . .
17m drivetrain
18 power electronic converter (at the airborne side/site)
30 tether and coupling unit, tether
30' bridling element, bridling
31 core, mechanical load carrier
31a circumferential surface
32 cable, electrical load carrier
33 cable, electrical load carrier
34 litz wire, wire
35 litz wire, wire
36 insulator
37 (grounded) shield
38 cable jacket
39 tether jacket
39' space, filling material
41 current path
42 current path
50 ground unit, ground station
57 connection node
58 power electronic converter (at the ground side/site)
58-1 1$^{st}$ power electronic converter (at the ground side/site)
58-2 2$^{nd}$ power electronic converter (at the ground side/site)
58-3 3$^{rd}$ (unifying) power electronic converter (at the ground side/site)
59 uninterruptible power supply (UPS)
60 fuse system
61 1$^{st}$ fuse element
62 2$^{nd}$ fuse element
63 3$^{rd}$ fuse element
64 diode element
65 over-current shut-off unit, fuse unit
70 power grid
100 airborne power generation system, airborne wind power conversion system
100' airborne system
101 kite trajectory
102 (direction of) electric power transmission
102' (direction of) electric power transmission
103 (direction of) wind velocity
C # capacitor element, capacitor
D # diode element, diode
F # fuse element, fuse
GND ground potential, reference potential
K potential of the frame of the kite 10'/airborne vehicle 10
R # resistor element, resistor

The invention claimed is:

1. An airborne system comprising:
an airborne unit configured as an aerial vehicle,
a ground unit comprising an electrical power source/sink unit configured to supply and/or receive electrical power to and from the airborne unit, respectively, and
a coupling and tether unit that mechanically and electrically couples the airborne unit to the ground unit, the coupling and tether unit comprising a core and a plurality of cables arranged around the core, wherein the cables transmit electrical power between the airborne unit and the ground unit and each cable is electrically insulated from the other cables at least in the tether unit,
wherein:
the airborne unit comprises a plurality of motor/generator units each of which has at least one wind harvesting/propelling rotor mechanically coupled thereto,
each of the plurality of cables is configured to form at least a part of an electrical transmission path to electrically couple the electrical power source/sink unit with motor/generator units in order to transmit electrical power between the electrical power source/sink unit and a motor/generator unit or a group of motor/generator units, and
motor/generator units and their assigned electrical transmission paths are electrically and/or galvanically uncoupled with respect to each other at least in the airborne unit and in the coupling unit.

2. The airborne system according to claim 1, wherein the electrical power source/sink unit:
comprises or is formed by one or a plurality of electrical power storage means and/or solar power conversion means, wherein in particular respective groups of motor/generator units, electrical power storage means and/or solar power conversion means, and their assigned electrical transmission paths are electrically and/or galvanically uncoupled with respect to each other at least in the airborne unit and in the coupling unit.

3. The airborne system according to claim 1, which is formed as an airborne power generation system, wherein said airborne unit:
(i) is formed as a kite, an electrically driven plane, and/or an electrically driven multicopter; and
(ii) is configured to harvest and convert wind power into electrical power.

4. The airborne system according to claim 3, wherein:
a ground unit is provided which comprises or is formed by at least a part of the electrical power source/sink unit and which is configured to send and/or receive electrical power to and from the airborne unit, respectively, and
the coupling unit is formed as a coupling and tether unit for mechanically and electrically coupling the airborne unit to the ground unit and configured to transmit electrical power between the airborne unit and the ground unit.

5. The airborne system according to claim 1, wherein:
a drivetrain is provided for each group of motor/generator units and assigned thereto; and
the drivetrains are electrically and/or galvanically uncoupled, insulated, isolated and/or separated with respect to each other at least in the airborne unit and in the coupling unit.

6. The airborne system according to claim 1, wherein:
a respective group of motor/generator units comprises one or a plurality of motor/generator units, and/or
each group of motor/generator units comprises the same number of motor/generator units.

7. The airborne system according to claim 1, wherein, for each respective group of motor/generator units, the airborne unit comprises an assigned power electric converter and/or an assigned set of the plurality of cables at the coupling unit side of the respective assigned power electric converter and/or connectable to the coupling unit and/or to respective corresponding assigned sets or pairs of cables of the coupling unit and of the coupling and tether unit.

8. The airborne system according to claim 1, wherein the coupling unit comprises for each respective group of motor/generator units an assigned set of the plurality of cables connected or connectable within or to the airborne unit and/or connected or connectable to the electrical power sink/source unit, as a part of a respective corresponding assigned drivetrain and/or to respective corresponding assigned sets or pairs of cables of the airborne unit and of the electrical power source/sink unit.

9. The airborne system according to claim 8, wherein:
each member of the pair of cables has assigned thereto either one of a positive electrical polarity and a negative electrical polarity of a DC system or one of a set of phases of an AC system,
the coupling and tether unit comprises a core having a circumferential surface and/or
pairs of cables are aligned at the circumferential surface such that each member of the pair of cables having assigned thereto a given polarity or phase is aligned (i) directly adjacent to a member of a pair of cables of the same assigned electrical polarity or phase as well as (ii) directly adjacent to a member of a pair of cables of the opposite assigned electrical polarity or a different phase.

10. The airborne system according to claim 1, wherein the electrical power source/sink unit comprise for each respective group:
an assigned uninterruptible power supply unit configured for supplying power to the respective corresponding assigned set of the plurality of cables for controllably operating the respective motor/generator units in a motor or propeller mode, and/or
an assigned power electronic converter configured to receive electric power from a respective corresponding assigned set of the plurality of cables, to convert said received electric power and to feed said converted electric power into a power sink.

11. The airborne system according to claim 1, wherein a respective group comprises motor/generator units which in their entirety give a symmetric contribution with respect to mass and/or angular momentum regarding the center of mass of the underlying airborne unit.

12. The airborne system according to claim 1, wherein the electrical power source/sink unit comprise for each respective group, an over-current shut-off system which is configured to connect a cable of the plurality of cables to a reference or ground potential of the electrical power source/sink unit, of the ground unit and/or of the airborne unit in case that a current conveyed by the respective cable exceeds a threshold value (Imax).

13. The airborne system ($100'$) according to claim 12, wherein a respective fuse system comprises for each respective group in each cable of the respective assigned set of the plurality of cables a fuse unit having a first fuse element electrically connected in series in each cable of the set of the plurality of cables and at least one of:
(i) a second fuse element electrically connected in series to the first fuse element and in the respective cable of the set of the plurality of cables; or
(ii) a third fuse element in parallel to (a) a serial node which is located at a side of the electrical power source/sink unit or between the first and second fuse elements and (b) to said reference or ground potential of the electrical power source/sink unit, the ground unit and/or of the airborne unit.

14. The airborne system according to claim 13, wherein said third fuse element is in serial connection combined with a diode element, both in parallel connection to the serial node between the first and second fuse elements connected in reverse direction relative to the normal potential difference between the potential of the respective cable and the reference or ground potential.

15. The airborne system according to claim 13, wherein relative trigger or switching times TF1, TF6 of first to third fuses F1 to F6 of the fuse units underlying the fuse systems for the cables of the plurality of cables of a given drivetrain fulfill the following conditions (1) to (6):

$$\text{for the second fuse } F1 \text{ of the first cable: } {}^T F I^{=T} \text{ mm,} \tag{1}$$

$$\text{for the second fuse } F2 \text{ of the second cable: } T \geq AT \neq, \tag{2}$$

$$\text{for the first fuse } F3 \text{ of the first cable: } T_{F3} > ax\{T_{F1}, T_{F2}\}, \tag{3}$$

$$\text{for the first fuse } F4 \text{ of the second cable: } T_{P4} > \Omega T'AX\{T_{P1}, T_{P2}\} \wedge T_{P4} \neq T_{P3}, \tag{4}$$

$$\text{for the third fuse } F5 \text{ of the first cable: } T_{P5} > \max\{7_3, 7_4\}, \tag{5}$$

$$\text{for the third fuse } F6 \text{ of the second cable: } T_{F6} > \max\{7_3, T_{P4}\}, \text{ and} \tag{6}$$

wherein $T_m$m denotes a minimum delay time determined in order to ensure that a fuse opens only due to a short circuit current.

16. An airborne power generation method, comprising:
providing an aerial vehicle as an airborne unit having power conversion means for converting wind power to electrical power, the airborne unit comprises a plurality of motor/generator units each of which has at least one wind harvesting/propelling rotor mechanically coupled thereto,
providing a ground unit which comprises an electrical power source/sink unit and which is configured to send and/or receive electrical power to and from the airborne unit,
coupling the airborne unit to the ground unit via a coupling and tether unit, the coupling and tether unit comprising a core and a plurality of cables arranged around the core, wherein the cables transmit electrical power between the airborne unit and the ground unit and each cable is electrically insulated from other cables, launching and controllably flying the aerial vehicle into a wind power harvesting trajectory, and then operating the aerial vehicle to harvest and convert wind power into electrical power, and transmitting electrical power to or from the aerial vehicle via a coupling and tether unit, wherein each of the plurality of cables is configured to form at least a part of an electrical transmission path between the electrical power source/sink unit and a motor/generator unit or a group of motor/generator units, and wherein motor/generator units and their assigned electrical transmission paths are electrically and/or galvanically uncoupled with respect to each other at least in the airborne unit and in the coupling unit.

17. A method of using an airborne system, the method comprising:

providing an aerial vehicle as an airborne unit, the airborne unit comprising a plurality of motor/generator units each of which has at least one wind harvesting/propelling rotor mechanically coupled thereto, providing a ground unit which comprises an electrical power source/sink unit and which is configured to send and/or receive electrical power to and from the airborne unit, coupling the airborne unit to the ground unit via a coupling and tether unit, the coupling and tether unit comprising a core and a plurality of cables arranged around the core, wherein the cables transmit electrical power between the airborne unit and the ground unit and each cable is electrically insulated from other cables, launching and controllably flying the aerial vehicle into a wind power harvesting trajectory, and then operating the aerial vehicle to harvest and convert wind power into electrical power, and transmitting electrical power to or from the aerial vehicle via a coupling and tether unit, wherein each of the plurality of cables is configured to form at least a part of an electrical transmission path between the electrical power source/sink unit and a motor/generator unit or a group of motor/generator units, and wherein groups of motor/generator units and their assigned electrical transmission paths are operated in an electrically and/or galvanically uncoupled manner with respect to each other at least in the airborne unit and in the coupling and tether unit.

* * * * *